(12) United States Patent
Millett-Sikking et al.

(10) Patent No.: US 12,546,981 B2
(45) Date of Patent: Feb. 10, 2026

(54) OBLIQUE PLANE MICROSCOPY SYSTEM AND METHOD

(71) Applicant: CALICO LIFE SCIENCES LLC, South San Francisco, CA (US)

(72) Inventors: Alfred Millett-Sikking, Burlingame, CA (US); Andrew Gregory York, San Francisco, CA (US)

(73) Assignee: CALICO LIFE SCIENCES LLC, South San Francisco, CA (US)

(*) Notice: Subject to any disclaimer, the term of this patent is extended or adjusted under 35 U.S.C. 154(b) by 739 days.

(21) Appl. No.: 17/434,457

(22) PCT Filed: Feb. 26, 2020

(86) PCT No.: PCT/US2020/019847
§ 371 (c)(1),
(2) Date: Aug. 27, 2021

(87) PCT Pub. No.: WO2020/176591
PCT Pub. Date: Sep. 3, 2020

(65) Prior Publication Data
US 2022/0260818 A1    Aug. 18, 2022

Related U.S. Application Data

(60) Provisional application No. 62/888,016, filed on Aug. 16, 2019, provisional application No. 62/859,516, filed on Jun. 10, 2019, provisional application No. 62/811,174, filed on Feb. 27, 2019.

(51) Int. Cl.
*G02B 21/00* (2006.01)
*G02B 21/33* (2006.01)

(52) U.S. Cl.
CPC ....... *G02B 21/006* (2013.01); *G02B 21/0032* (2013.01); *G02B 21/0048* (2013.01); *G02B 21/33* (2013.01); *G02B 21/0076* (2013.01)

(58) Field of Classification Search
CPC .............. G02B 21/006; G02B 21/0032; G02B 21/0048; G02B 21/33; G02B 21/0076; G02B 21/16; G02B 21/361
See application file for complete search history.

(56) References Cited

U.S. PATENT DOCUMENTS

| | | | |
|---|---|---|---|
| 8,498,048 B2 | 7/2013 | Wilson et al. | |
| 8,582,203 B2 | 11/2013 | Dunsby | |
| 9,030,734 B2 | 5/2015 | Knebel et al. | |
| 9,823,457 B2 * | 11/2017 | Li | G02B 21/367 |
| 10,416,434 B2 * | 9/2019 | Fujimoto | G02B 21/26 |

(Continued)

FOREIGN PATENT DOCUMENTS

| | | |
|---|---|---|
| CN | 206039021 U | 3/2017 |
| CN | 108700460 A | 10/2018 |

(Continued)

OTHER PUBLICATIONS

Bin Yang et al. (High Numerical Aperture Epi-illumination Selective Plane Illumination Microscopy) (Year: 2018).*

(Continued)

*Primary Examiner* — Mustak Choudhury
(74) *Attorney, Agent, or Firm* — Lando & Anastasi, LLP

(57) ABSTRACT

Systems and methods for oblique plane microscopy are disclosed.

26 Claims, 16 Drawing Sheets

(56) References Cited

U.S. PATENT DOCUMENTS

| 10,642,019 | B2* | 5/2020 | Fujimoto | G01N 21/01 |
|---|---|---|---|---|
| 2009/0135432 | A1* | 5/2009 | Betzig | G01N 21/6458 |
| | | | | 356/521 |
| 2011/0261446 | A1* | 10/2011 | Dunsby | G02B 21/16 |
| | | | | 359/380 |
| 2013/0335818 | A1* | 12/2013 | Knebel | G02B 21/0032 |
| | | | | 359/385 |
| 2018/0259762 | A1* | 9/2018 | Fujimoto | G01N 21/6428 |
| 2018/0321480 | A1* | 11/2018 | Ohrt | G01N 1/30 |
| 2021/0318530 | A1* | 10/2021 | Deissler | G02B 21/0068 |

FOREIGN PATENT DOCUMENTS

| EP | 3440491 | A2 | 2/2019 | | |
|---|---|---|---|---|---|
| TW | 201830086 | A | 8/2018 | | |
| WO | 2017174795 | A3 | 11/2017 | | |
| WO | WO-2018069170 | A1* | 4/2018 | ......... | G01N 21/6458 |
| WO | 2018089865 | A1 | 5/2018 | | |

OTHER PUBLICATIONS

High Numerical Aperture Epi-illumination Selective Plane Illumination Microscopy. Bin Yang1, Yina Wang 1, Siyu Feng2, Veronica Pessinou, Nico Stuurman4.5, Bo Huang1•6•7 (Year: 2018).*

Botcherby et al. "An optical technique for remote focusing in microscopy", Optics Communications (2007) vol. 281, No. 4, pp. 880-887.

Dunsby, "Optically sectioned imaging by oblique plane microscopy", Optics Express, vol. 16, No. 25 (2008), pp. 20306-20316.

Yang, B. et al. "High Numerical Aperture Epi-illumination Selective Plan Illumination Microscopy—Supplementary Figures," bioRxiv, 2018, XP055695811, Retrieved from the Internet: URL: https://www.biorxiv.org/content/biorxiv/suppl/2018/02/28/273,359.DCI/273359-1.pdf [retrieved on May 15, 2020] figure S3.

Yang, B. et al. "High Numerical Aperture Epi-illumination Selective Plan Illumination Microscopy," bioRxiv, 2018, <http://dx.doi.org/10.1101/273359>.

* cited by examiner

OBLIQUE PLANE MICROSCOPY SYSTEM AND METHOD

CROSS-REFERENCE TO RELATED APPLICATIONS

This application is a U.S. national phase application and claims the benefit of priority under 35 U.S.C. § 371 to International (PCT) Patent Application Serial No. PCT/US2020/019847 filed on Feb. 26, 2020 which, in turn, claims the benefit of priority to U.S. Provisional Patent Application Ser. No. 62/888,016 filed on Aug. 16, 2019, U.S. Provisional Patent Application Ser. No. 62/859,516 filed on Jun. 10, 2019, and U.S. Provisional Patent Application Ser. No. 62/811,174 filed on Feb. 27, 2019, the entire disclosure of each of which is hereby incorporated herein by reference in its entirety for all purposes.

BACKGROUND

Conventional optical microscopy provides high resolution imaging for a wide range of applications. In certain situations, for example, where biological samples are being imaged, it is desirable to obtain optically sectioned images, which usually correspond to axially thin slices through the sample. Advantages of optically sectioned imaging include improved image contrast through the reduction in contributions from out-of-focus planes and the ability to produce three-dimensional (3D) images. So-called "light-sheet" microscopy is an optically sectioned imaging technique in which a thin "sheet" of light is used to illuminate the sample. This approach is beneficial in many applications, particularly for imaging living biological samples, because the illumination beam dose is lower than in various other conventional optically sectioned imaging techniques, and the approach is therefore far less photo-toxic to the sample. Despite its benefits, light-sheet microscopy historically was not widely adopted due to the awkward nature of most implementations, which use two orthogonally positioned lenses; one lens to deliver the light-sheet (to illuminate the sample) and the other to collect the image. Due to the resulting geometrical constraints, these implementations are typically not compatible with many biological sample preparation techniques, including glass slides, dishes, and multi-well plates.

A form of light-sheet microscopy, referred to as oblique plane microscopy, was developed in which three objectives are used to tilt the image plane and thereby achieve in-focus imaging of an oblique plane within the sample. Oblique plane microscopy allows an oblique plane in the sample to be illuminated and imaged with the same objective lens and is therefore compatible with standard glass-slide and other sample preparation techniques, while also retaining the benefits of minimal photobleaching and phototoxicity associated with optically sectioned imaging. The concept of oblique plane microscopy and implementations thereof are described in "*Optically sectioned imaging by oblique plane microscopy*," by C. Dunsby, OPTICS EXPRESS, Vol. 16, No. 25, Dec. 8, 2008 (herein referred to as "Dunsby"). The oblique plane microscopy system presented in Dunsby provided a benefit over conventional optically sectioned microscopy methods; however, the figure of merit, specifically the numerical aperture (NA) of the optical system, is too low for the technique to be useful in many applications. For example, conventional high-resolution microscopy can achieve a numerical aperture value as high as 1.33 for an aqueous sample, whereas the Dunsby system achieves a theoretical numerical aperture value of only 0.74 for a water immersion objective.

A modification to the oblique plane microscopy system described in Dunsby was presented by Yang et al. in "*High Numerical Aperture Epi-illumination Selective Plane Illumination Microscopy*," published as a preprint article on bioRxiv on Feb. 28, 2018 (herein referred to as "Yang"). Referring to FIG. 1, the Yang system is a single-objective oblique epi-illumination selective plane illumination microscope in which a water-immersion objective (O1) 110 is used for both sample illumination and fluorescence collection. According to Yang, the illumination light-sheet has an incident angle of 60 degrees (°) relative to the optical axis of O1, and a remote imaging module includes two objective lenses (O2 and O3) 120, 130 arranged at an angle of 30°, such that the intermediate image produced by O2 is re-imaged by O3 in focus. The light 140 is focused by optics 150 onto a detector 160 for imaging. Yang discloses that the tilted arrangement of O2 and O3 conventionally caused a loss in numerical aperture (e.g., as is the case with the Dunsby system) because it tilts part of the light cone generated by O2 out of the collectable range of O3. For high numerical aperture systems in which O3 is tilted relative to O2, when the numerical aperture of O2 is high enough to ensure sufficient coverage of the numerical aperture of O1, in previous implementations it was impractical for O3 to have an even larger collection cone. Yang addressed this issue by selecting a mismatched pair of objectives for the remote imaging module, using an air objective for O2 (NA=0.9) and a water-immersion objective for O3 (NA=1.0) and separating the focal space between O2 and O3 with a coverglass located at the intermediate image plane 170 to allow for water on one side and air on the other. According to Yang, the z' position of the coverglass can be adjusted to minimize spherical aberration, and the refractive index difference between the working media (air and water) of O2 an O3 compresses the angle of the O2 light cone, thereby reducing numerical aperture loss.

SUMMARY OF INVENTION

The Yang system achieves a numerical aperture value of 1.06, much higher than that of the Dunsby system, but still less than the $NA=n_0(=1.33$ for aqueous samples) that can be theoretically achieved using conventional high-resolution optical microscopy. Aspects and embodiments are directed to oblique plane microscopy systems that achieve a numerical aperture value approaching the theoretical $NA=n_0$ limit achievable with conventional high resolution microscopes, while also providing the benefits (e.g., reduced photobleaching and phototoxicity, improved image contrast, and ability to produce 3D images) associated with optically sectioned imaging as well as convenient, practical implementation arrangements than can be used with standard bench microscopes and common sample preparation techniques, including glass coverslips and multi-well plates. Accordingly, aspects and embodiments may provide a solution for nearly uncompromised single-objective oblique plane microscopy suitable for a broad range of applications.

According to one embodiment, an oblique plane microscopy system is configured to image a sample having a refractive index $n_0$, the system comprising a first microscope arranged to receive light emitted from the sample, the first microscope including a first objective lens having at least one of a first numerical aperture $NA_1 \geq n_0$ and a first immersion medium with a first refractive index $n_1$ that is approximately equal to $n_0$, a second microscope including a second objective lens, a combination of the first and second microscopes being configured to produce an intermediate image of the sample with a magnification $M_{RR}$, the second objective lens having a second numerical aperture $NA_2$, the intermediate image being formed in a second immersion medium having a second refractive index $n_2$, wherein the magnification $M_{RR}$ is approximately equal to a ratio ($n_1/n_2$) of the refractive indices of the first and second immersion media, and a third microscope focused on the intermediate image and including a third objective lens having a third numerical aperture, the third objective having an optical axis that is tilted relative to an optical axis of the second objective by a tilt angle such that the third microscope images an oblique plane in the intermediate image, corresponding to an oblique plane in the sample, the third objective lens being configured and arranged to collect substantially all the light from the second microscope.

In one example, the refractive index of the sample is in a range of 1.33 to 1.41. In one example, the first objective lens is a silicone immersion lens. In another example, the first numerical aperture is $NA_1 \geq 1.35$. In another example, the first refractive index is $n_1=1.41$. In another example, the second immersion medium is air such that the second refractive index is $n_2=1.0$. In one example, the second numerical aperture is $NA_2 \geq 0.95$.

In another example, a ratio of the second numerical aperture to the second refractive index ($NA_2/n_2$) is greater than or equal to a ratio of the first numerical aperture to the first refractive index ($NA_1/n_1$).

In one example, the tilt angle is selected to optimize a collection efficiency of the microscopy system.

In another example, the first objective lens is a glycerol immersion lens.

In another example, the third numerical aperture is $NA_3 \geq n_2$.

In one example, the third objective lens includes a solid glass frustum. In another example, the third objective lens is configured with a working distance in a range of 0-20 µm in air.

In one example, the oblique plane microscopy system further comprises a light source arranged to provide an incident beam of light to illuminate an oblique plane in the sample, the oblique plane illuminated corresponding to the oblique plane being imaged. In one example, the incident beam of light is directed through the first objective lens. In another example, the third microscope is rotatable to adjust the tilt angle. In one example, the tilt angle is selected based in part on a divergence angle of the illumination light beam.

The first microscope may further include a first lens, the first microscope having a first magnification $M_1$, and wherein the second microscope further includes a second lens having a focal length, $f_{TL2}$, selected to set a magnification of the second microscope, $M_2$, such that $M_{RR}=M_1*M_2^{-1}=(n_1/n_2)$.

According to another embodiment, an oblique plane microscopy system configured to image a sample having a refractive index $n_0$ comprises a first microscope arranged to receive light emitted from the sample, the first microscope including a first objective lens having a first numerical aperture $NA_1$ and a first immersion medium with a first refractive index $n_1$, the first objective lens being configured based on a selected compromise between a first ideal condition of $NA_1 \geq n_0$ and a second ideal condition of $n_1$ being approximately equal to $n_0$, a second microscope including a second, air-immersion objective, a combination of the first and second microscopes being configured to produce an intermediate image of the sample with a magnification $M_{RR}=n_1$, and wherein a second numerical aperture of the second, air-immersion, objective, $NA_2$, is selected to approach a third ideal condition of $NA_2$ being greater than or equal to a ratio of the first numerical aperture to the first refractive index ($NA_1/n_1$), and a third microscope focused on the intermediate image and including a third objective lens having a third numerical aperture $NA_3 \geq 1$, the third objective having an optical axis that is tilted relative to an optical axis of the second objective by a tilt angle such that the third microscope images an oblique plane in the intermediate image, corresponding to an oblique plane in the sample.

In one example, the first objective lens is a silicone immersion objective.

In another example, the tilt angle is selected to optimize a collection efficiency of the microscopy system.

In one example, the third objective lens includes a solid glass frustum positioned to intersect a field-of-view of the second, air-immersion objective. In one example, the solid glass frustum has a beveled edge. In another example, the solid glass frustum is shaped to allow an end region having a size corresponding to the field-of-view of the second, air-immersion objective to be inserted into the field-of-view and to collect the available light from the second, air-immersion objective. In another example, the third microscope is rotatable to adjust the tilt angle.

Another embodiment is directed to a method of configuring a microscopy system for imaging an oblique plane in a sample, the microscopy system including a first microscope, a second microscope, and a third microscope. The method comprises selecting a first objective for the first microscope based on a chosen compromise between first and second ideal conditions for the first objective, the first ideal condition being that the first objective has a first numerical aperture $NA_1 \geq n_0$, wherein $n_0$ is an estimate of a refractive index of the sample, and the second ideal condition being that the first objective has a first immersion medium with a first refractive index $n_1 \approx n_0$, wherein the first objective is configured to direct an illumination light-sheet to the sample and to collect emission light from the sample, selecting a second objective for the second microscope, the second objective being configured to collect substantially all the emission light from the first objective, configuring the second microscope to re-image the oblique plane in the sample onto an intermediate image plane, selecting a third objective for the third microscope, the third objective being positioned on an opposite side of the intermediate image plane relative to the second objective and configured to collect substantially all the emission light from the second objective while accommodating a tilt angle α, and positioning the third objective such that a primary optical axis of the third objective is rotated relative to a primary optical axis of the second objective by the tilt angle α.

In one example, configuring the second microscope to re-image the oblique plane in the sample includes configuring a magnification of the second microscope, $M_2$, such that a magnification, $M_{RR}$, of an image of the oblique plane in the sample at the intermediate image plane satisfies the condition: $M_{RR}=M_1 M_2^{-1}=n_1/n_2$, where $M_1$ is a magnification of the first microscope, $n_1$ is a refractive index of an immersion medium of the first objective, and $n_2$ is a refractive index of an immersion medium of the second objective. In another example, the second microscope includes a lens, and configuring the magnification of the second microscope includes selecting a focal length of the lens. In one example, selecting the second objective includes selecting an air-immersion second objective. In another example, selecting the first objective includes selecting a silicone immersion objective. In another example, selecting the first objective includes selecting a glycerol immersion objective. In one example, selecting the third objective includes selecting a third objective having a solid glass frustum. In another example, positioning the third objective includes positioning the third objective such that a tip of the solid glass frustum intersects a field-of-view of the second objective. In another example, selecting the second objective includes minimizing $n_2$ and selecting a second numerical aperture, $NA_2$, of the second objective to meet the condition: $NA_2/n_2 \geq NA_1/n_1$.

In one example, the method further comprises adjusting the tilt angle based in part on a divergence angle of the illumination light-sheet.

According to another embodiment, a microscopy system for high numerical aperture, low aberration imaging of a tilted image plane comprises a first objective arranged to collect emitted light from a sample and having a first numerical aperture $NA_1$ and a first immersion medium with a first refractive index $n_1$, the first objective being configured based on a chosen compromise between first and second conditions, the first condition being $NA_1 \gtrsim n_0$ and the second condition being $n_1 \approx n_0$, wherein $n_0$ is an estimate of a refractive index of the sample, a second objective having a second numerical aperture $NA_2$ and being positioned and configured to collect substantially all the emitted light from the first objective, a combination of the first and second objectives being configured to produce an intermediate image of the sample, and a third objective focused on the intermediate image, the third objective having an optical axis that is tilted relative to an optical axis of the second objective by a tilt angle such that the third objective images the tilted plane in the intermediate image, the third objective further having a solid glass frustum that is shaped to allow an end region having a size corresponding to a field-of-view of the second objective to be inserted into the field-of-view and to collect substantially all the emitted light from the second objective while accommodating the tilt angle.

In one example, the first objective is further configured and arranged to deliver an illumination light beam to the sample.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

Aspects and embodiments provide a solution for imaging a tilted plane at high numerical aperture with minimal aberrations and loss in numerical aperture or optical efficiency, and which may be applied to a wide variety of imaging applications. Certain aspects and embodiments are directed to an oblique plane microscopy system that uses a single objective to illuminate a sample and to collect light from the sample, along with an imaging module that includes two additional objectives to produce high resolution images of the sample. As used herein the term "objective" refers to an optical module that includes one or more optical elements, such as lenses or mirrors, and is used synonymously herein with the term "objective lens." As discussed further below, embodiments of the microscopy system disclosed herein may achieve a numerical aperture (NA) value in a range of 1.2-1.3, approaching the $NA=n_0$ (=1.33 in aqueous samples) limit value set by conventional, non-optically sectioned (but high resolution) microscopes, and providing significant resolution improvements over the systems disclosed in Dunsby (theoretical NA of only 0.74) and Yang (realized NA of 1.06).

Figure 1:
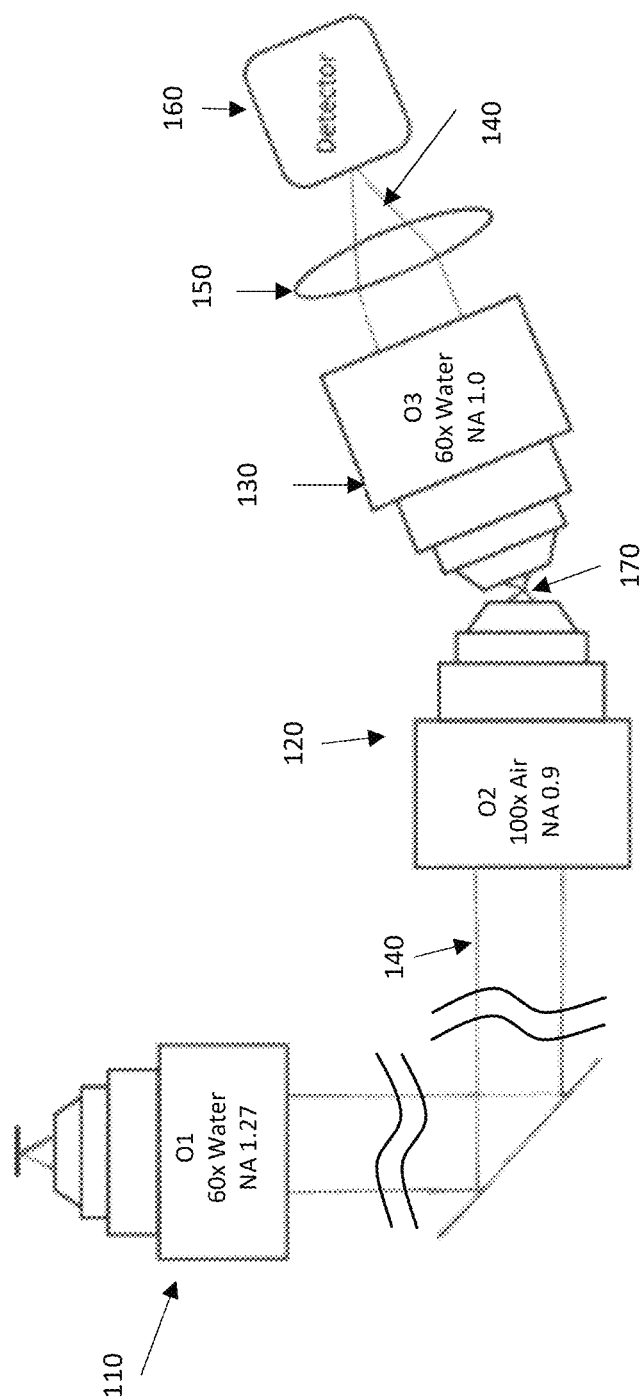
FIG. 1 is a diagram of one example of an oblique plane microscopy system.
Figure 2A:
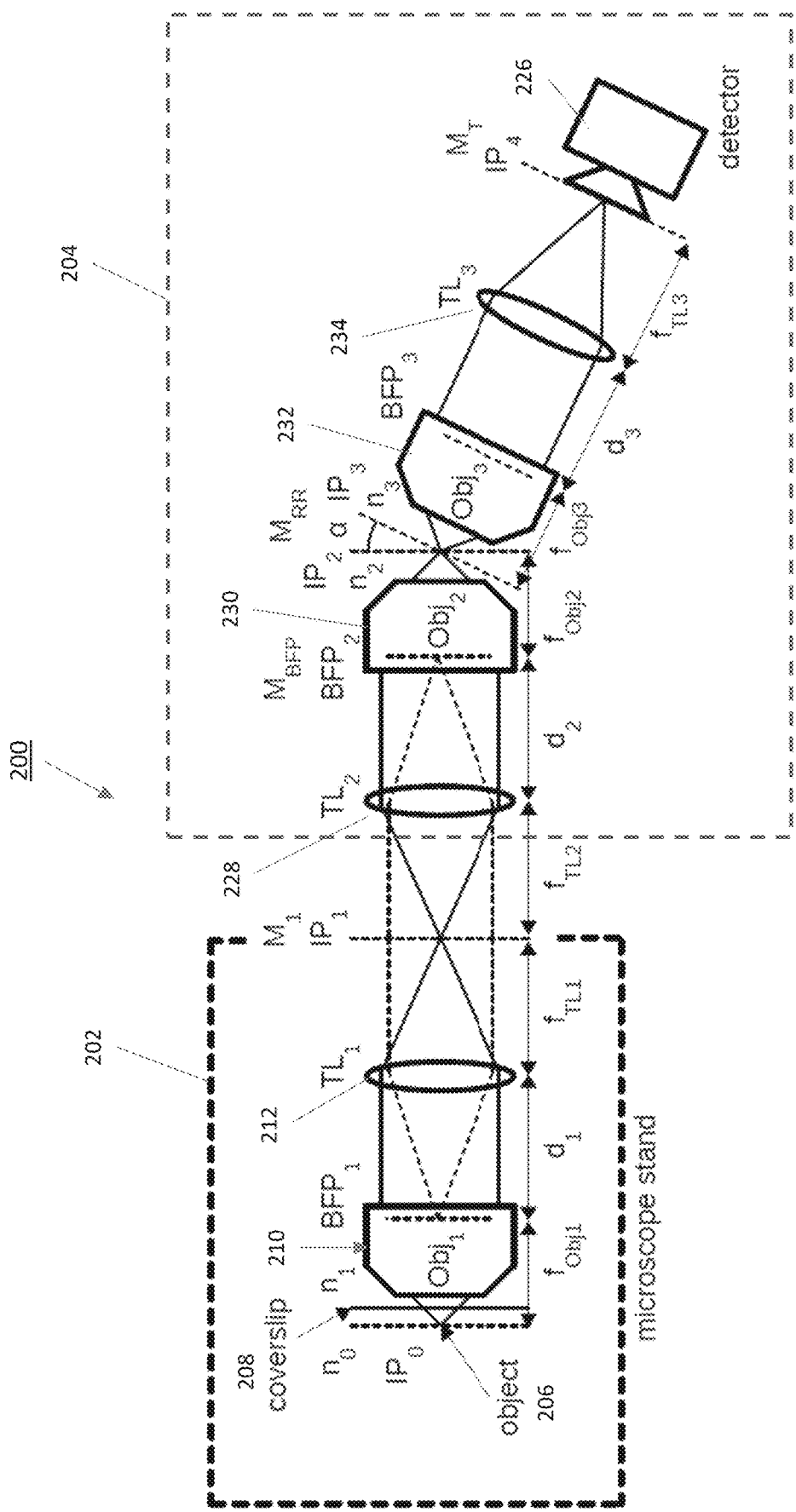
FIG. 2A is a functional block diagram showing the light collection path for one example of an oblique plane light-sheet microscopy system according to aspects of the present invention.

Referring to FIG. 2A there is illustrated a functional block diagram of one example of a microscopy system according to certain embodiments. As shown, the microscopy system 200 includes a microscope module 202 and an imaging module 204 configured to image a sample 206. The microscope module 202 includes a first objective 210 ($Obj_1$) and a first lens 212 ($TL_1$), which are also referred to herein in combination as the "first microscope". In the example shown in FIG. 2A, the sample 206 is prepared on a coverslip 208 that is placed at a front focal plane, or object image plane ($IP_0$), of the first objective 210; however, in other examples other sample preparation techniques can be used, such as dishes and multi-well plates, for example. The microscope module 202 may be a standard microscope in certain examples, that is converted into the oblique plane light-sheet microscopy system 200 through the inclusion and arrangement of the imaging module 204, as discussed below. The first objective 210 is used to both direct an illumination beam 216 to the sample 206 and to collect emitted light 220 from the sample 206. FIG. 2A shows only the light collection or imaging path of the microscopy system 200. For completeness, FIG. 2B shows an example of an arrangement of the microscope module 202 including the illumination path.

Figure 2B:
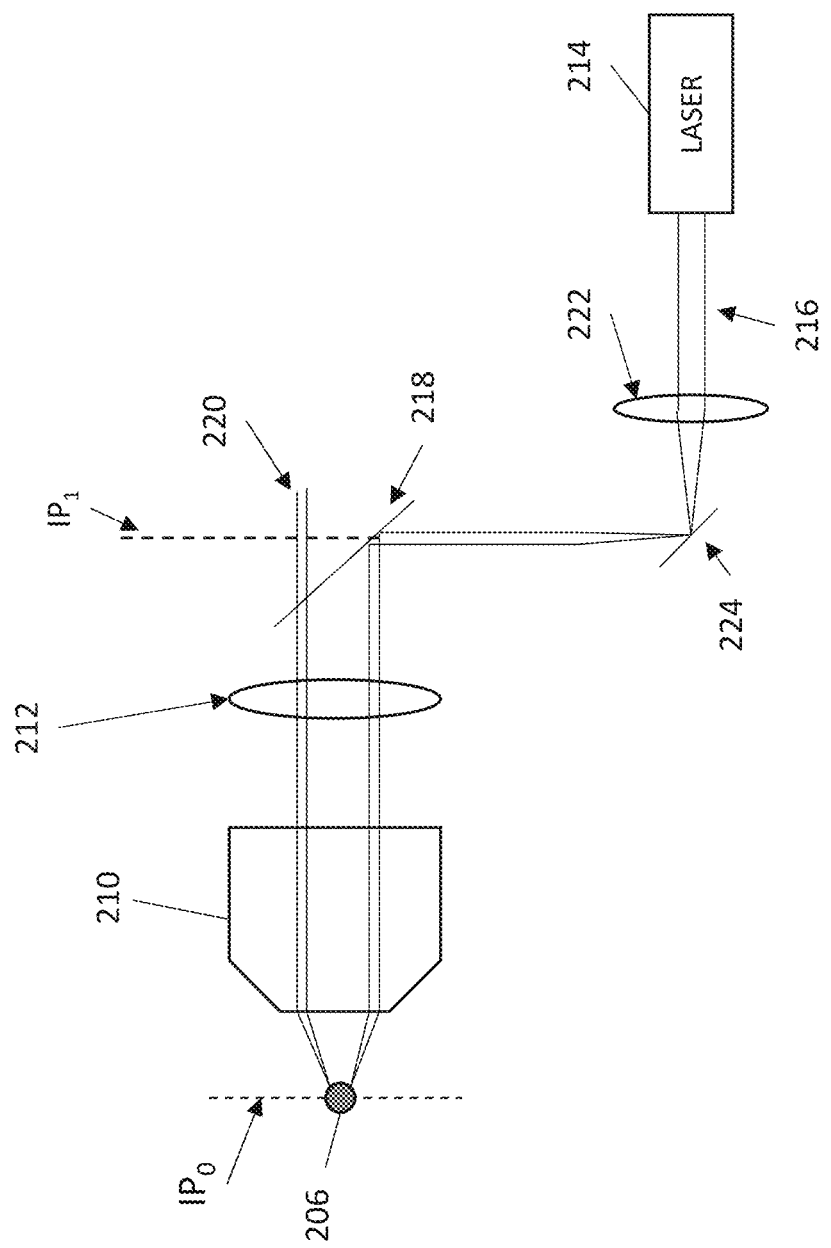
FIG. 2B is a functional block diagram of one example of a portion of the oblique plane light-sheet microscopy system showing an example of the illumination light path.

Referring to FIG. 2B, a light source 214, such as a laser, for example, produces the illumination beam 216. The illumination beam 216 is coupled into the optical path of the first objective 210 using a beam-coupling device 218, and focused by the first objective 210 onto the sample 206. In certain examples, the beam-coupling device 218 may be a beam-splitter that reflects the illumination beam 216 toward the first objective 210 and allows the emission light 220 from the sample 206 to pass through; however, in other examples, other arrangements or beam-coupling devices 218 may be used, as will be appreciated by those skilled in the art, given the benefit of this disclosure. Similarly, in the example shown in FIG. 2B, the illumination path include a lens 222 and a fold mirror 224 configured and arranged to direct the illumination beam 216 from the light source 214 to the beam-coupling device 218; however, in other examples any number and arrangement of optical elements (lenses or mirrors) may be used to direct the illumination beam to the first objective 210, as will be appreciated by those skilled in the art, given the benefit of this disclosure. In certain examples, the light source 214 and the optical elements (e.g., 218, 222, 224) that direct the illumination beam to the first objective 210 may be part of the microscope module 202. In other examples, one or more of these components may be separate from the microscope module 202, and may be included in the imaging module 204 or may be part of a separate module that can be coupled to the imaging module 204 and/or the microscope module 202.

Referring again to FIG. 2A, in one embodiment, the imaging module 204 includes a second microscope that includes a combination of a lens 228 ($TL_2$), a second objective 230 ($Obj_2$), and a third microscope that includes a combination of a third objective 232 ($Obj_3$), and a third lens 234 ($TL_3$). It is to be appreciated that although the first, second, and third lenses 212, 228, and 234 are represented in FIG. 2A as single lenses, each may be implemented in practice using one or more optical elements (lenses or mirrors). The imaging module 204 further includes a detector 226. The combination of the first lens 212 and the second lens 228 direct the light 220 (also referred as the emission or emission light) emitted from the sample 206 from a back focal plane ($BFP_1$) of the first objective 210 to a back focal plane ($BFP_2$) of the second objective 230. In the example shown in FIG. 2A, the first and second lenses 212, 228 are in a relayed configuration, with the microscope module 202 forming a first intermediate image plane ($IP_1$) between the first and second lenses 212, 228, and the second lens 228 relaying the light 220 from that image plane to the back focal plane ($BFP_2$) of the second objective 230. The third lens 234 focuses the light 220 from a back focal plane ($BFP_3$) of the third objective 232 onto a final image plane ($IP_4$) where it can be received by the detector 226. As shown in FIG. 2A, the second and third objectives 230, 232 are arranged tilted with respect to one another, such that a second intermediate image plane ($IP_2$) formed at a focal plane of the second objective 230 is tilted with respect to a third intermediate image plane ($IP_3$) formed at a focal plane of the third objective 232 by an angle $\alpha$. The angle $\alpha$ is referred to herein as the tilt angle of the third objective 232.

The imaging resolution of an aberration free microscopy system is proportional to the numerical aperture (NA). Thus, the higher the overall numerical aperture achieved, the better the imaging resolution of the system. Aspects and embodiments are directed to designing and configuring the microscopy system 200 to achieve a very high overall numerical aperture of the emission path, $NA_{em}$, (significantly higher than is achievable for the systems of either Dunsby or Yang), taking into account various properties and parameters of the sample 206 being imaged and the light-sheet (illumination beam) 216 that is used to illuminate the sample 206, as well as certain optical principles and mechanical constraints on practical implementations of the microscopy system 200. Certain specific examples for imaging a live biological sample 206 are presented below; however, the design process and principles disclosed herein may be applied to any type of sample to be imaged.

Figure 3:
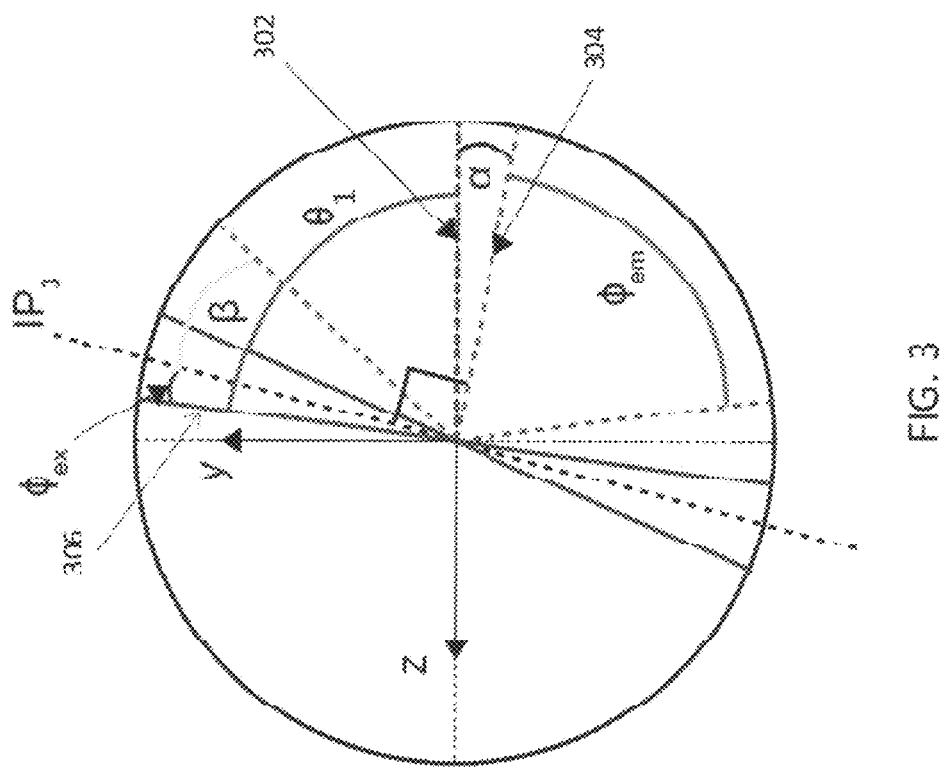
FIG. 3 is a diagram showing the relationships between theoretical collection angles and resulting collection/emission path numerical apertures of the various microscopes in an oblique plane light-sheet microscopy system according to aspects of the present invention.

Relationships among and constraints on various important parameters of the microscopy system 200 may be understood with reference to FIG. 3 and continuing reference to FIG. 2A. FIG. 3 is a diagram showing the relationships between the theoretical collection angles and the resulting collection/emission path numerical apertures of the various microscopes in the microscopy system 200. In FIG. 3, axis 302 corresponds to the primary optical axis of the microscopy system 200, which is also the primary optical axis of the first and second objectives 210, 230. The axis 304 corresponds to the tilted optical axis of the third objective 232, which is tilted relative to the primary optical axis 302 by angle $\alpha$, as discussed above. The numerical aperture of the sample/coverslip interface, and for each respective objective lens is given by Equation (1), where x=0, 1, 2, 3.

$$NA_x = n_x \sin \theta_x \quad (1)$$

In Equation (1), $n_x$ is the refractive index of the immersion medium of the sample or respective objective lens, and $\theta_x$ is the half angle subtended by the corresponding interface or objective lens.

The illumination light-sheet 216 has a divergence angle, $\Phi_{ex}$. Because a single objective lens (the first objective 210) is used to both illuminate the sample 206 and collect the light 220 emitted from the sample 206, some of the collection angle, $\theta_1$, of the first objective 210 is occupied or "used up" by the light-sheet, $\Phi_{ex}$, as shown in FIG. 3. FIG. 3 illustrates the "best case" where the edge of the light-sheet coincides with the edge of the collection cone of the first objective 210 ($\Phi_{ex}$ and $\theta_1$ measured from the same edge-line 306 in FIG. 3). It is possible for the light-sheet to be shifted inside the collection cone of the first objective 210 (i.e., the left edge of the cone defined by $\Phi_{ex}$ would be moved to the right, or in a clockwise direction, in FIG. 3), but this arrangement causes a loss in $NA_{em}$ (the portion of the achievable numerical aperture, $NA_1$, of the first objective 210 used for collecting emission).

According to Dunsby, the maximum potential numerical aperture achievable for the resultant overall numerical aperture of the emission path of the Dunsby microscopy system is given by:

$$NA_{pot} = n_1 \sin \Phi_{em} \quad (2)$$

Based on the assumption that the illumination and collection light beams 216, 220 are separated by 90° (orthogonal to one another), the half angle of the collected emission, $\Phi_{em}$, is derivable from FIG. 3 and, according to Dunsby, is given by Equation (3).

$$\Phi_{em} = 2\theta_1 - \Phi_{ex} - \pi/2 \quad (3)$$

However, as explained further below, according to certain aspects and embodiments, the microscopy system 200 can be configured to collect not only $\Phi_{em}$, but also β as well. β is a collection angle that represents additional emitted light that was not collected in the Dunsby system and is "recovered" in embodiments of the microscopy system 200 disclosed herein based on aspects of the present invention. Thus, according to certain aspects, in embodiments of the microscopy system 200:

$$NA_{em} = n_1 \sin(\Phi'_{em} + \beta/2) \quad (4)$$

This is based on the recognition that the third objective 232 in certain embodiments can be configured to capture nearly all the light from the second objective 230. Specifically, as discussed further below, the third objective 232 can be configured such that the numerical aperture, $NA_3$, of the third objective 232 exceeds the refractive index, $n_2$, of the immersion medium of the second objective 230 ($NA_3 \geq n_2$). This modifies the maximum potential overall numerical aperture for the emission/collection path, $NA_{em}$, to the form given in Equation (4), which includes the recovered emission half-angle, β/2, and is substantially higher than the $NA_{pot}$ value previously considered by Dunsby. From FIG. 3, it can be derived that:

$$\beta = \pi/2 - \Phi_{em} \quad (5)$$

The parameter $\Phi'_{em}$ used in Equation (4) is given by:

$$\Phi'_{em} = 2\theta_{min} - \Phi_{ex} - \pi/2 \quad (6)$$

In Equation (6), $\theta_{min} = \min(\theta_1, \theta_2)$, which reflects the recognition according to certain aspects of the present invention that the relevant parameter for $NA_{em}$ is the smaller of the two collection angles from the first and second objectives 210, 230. From the foregoing, Equation (4) can be rewritten as:

$$NA_{em} = n_1 \sin(\Phi'_{em}/2 + \pi/4) \quad (7)$$

Neglecting reflective losses, the collection efficiency, C, of the microscopy system 204 is at least as large as the square of the ratio of the actual/resultant emission path numerical aperture and the numerical aperture of the first objective 210:

$$C \geq (NA_{em}/NA_1)^2 \quad (8)$$

Figure 4:
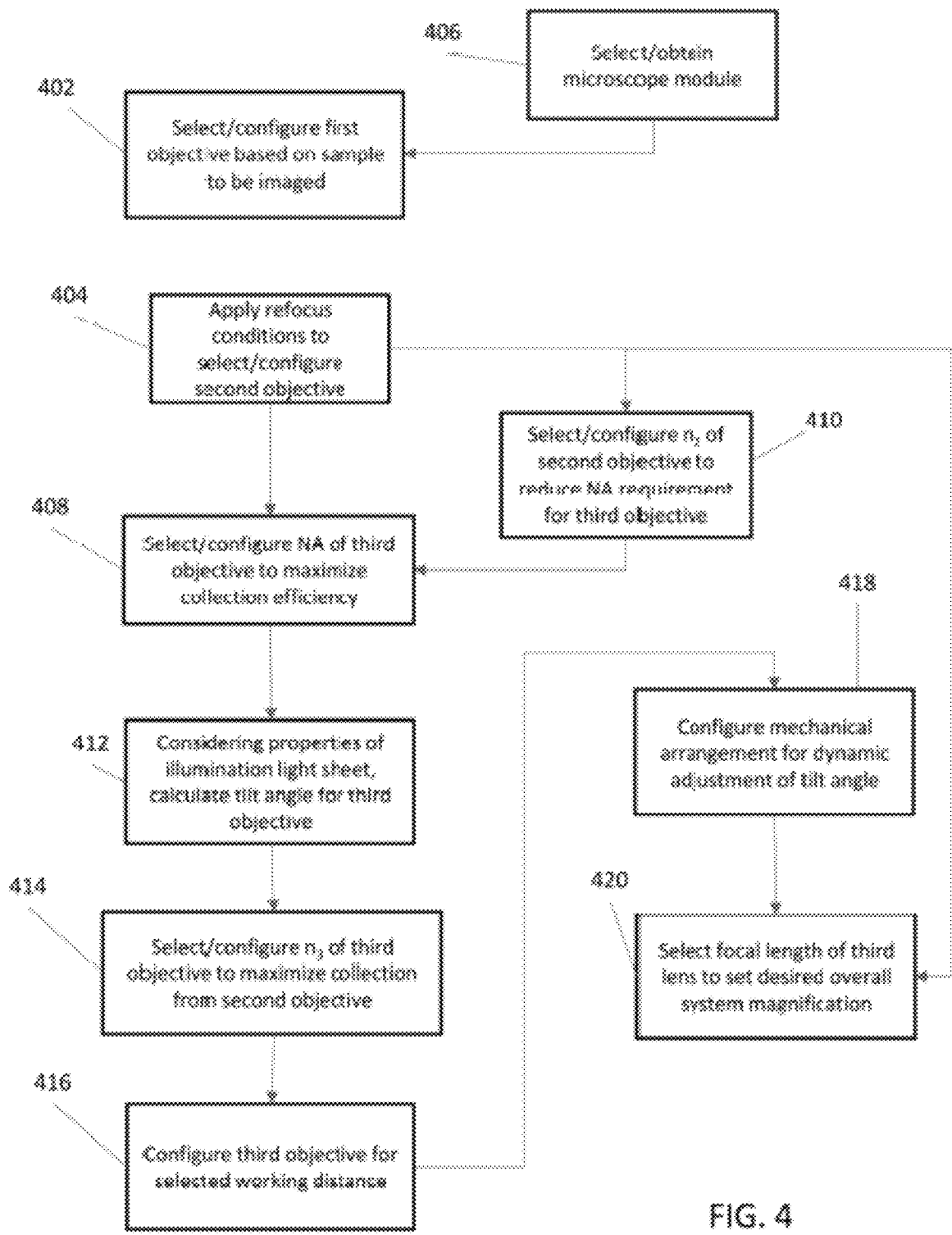
FIG. 4 is a process flow diagram illustrating an example of a design methodology for an oblique plane light-sheet microscopy system according to aspects of the present invention.

Based on the principles discussed above, embodiments of the microscopy system 200 can be designed and configured according to the following processes and considerations. FIG. 4 is a process flow diagram illustrating an example of steps and considerations that may be included in a method of designing an oblique plane light-sheet imaging microscopy system according to certain aspects. It will be appreciated by those skilled in the art that, given the benefit of this disclosure, that the steps need not be performed in the order illustrated in FIG. 4. The diagram of FIG. 4 is provided for clarity and convenience of description and is not intended to be limiting. The process described herein leverages the recognition that each of the three microscopes has certain properties and parameters that, when considered in the context of the overall system and in view of properties of the light-sheet 216 and sample 206 used in any given implementation, can be judiciously selected and configured to provide the microscopy system 200 with imaging performance and usefulness that was previously unattainable.

Step 402 includes selecting or configuring the first objective 210.

In certain applications, such as in fluorescence microscopy through a flat coverslip, the sample 206 may emit the light 220 in all directions, and therefore the following conditions hold: $\sin \theta_0 = 1$ and therefore, from Equation (1), $NA_0 = n_0$, where $n_0$ is the refractive index of the sample 206. As a result, according to certain aspects it is recognized that the first objective 210 may be configured to capture all of the light emitted from the sample 206 by setting $NA_1 \geq n_0$. In addition, for quality imaging, the first objective should be configured such that there is good matching between the refractive index of the sample medium ($n_0$) and the refractive index of the immersion medium of the first objective ($n_1$). A mismatch in refractive index causes depth-dependent aberrations in the resulting image of the sample 206. Thus, according to certain aspects, the first objective 210 can be configured to provide both good index matching and a good collection cone angle to maximize the collected light from the sample 206 and the imaging resolution and quality. Ideally, the first objective 210 may be configured with $NA_1 \geq n_0$ and $n_1 = n_0$; however, those skilled in art will appreciate, given the benefit of this disclosure, that it may not be possible in practice to achieve both of these ideal conditions simultaneously, particularly for multiple different samples. Accordingly, step 402 may include selecting a configuration for the first objective 210 based on a compromise of these two conditions, such that the largest practical numerical aperture is obtained while also achieving good matching in refractive index for an expected range of samples. Thus, in certain examples, the first objective 210 may be configured with $NA_1 \gtrsim n_0$ and $n_1 \approx n_0$.

Further, according to certain embodiments, the microscope module 202 can be configured such that the first lens 212 and the first objective 210 are fully infinity corrected lenses that approximate ideal lens behavior. This arrangement provides optimal remote refocus performance.

In order to re-image any plane within a limited volume in the sample 206 with minimal aberrations, the lateral and axial magnifications between the sample 206 and the second intermediate image plane ($IP_2$) formed at the focal plane of the second objective 230 need to be made equal. This condition is achieved when the magnification $M_{RR}$ is equal to $n_1/n_2$, where $n_2$ is the refractive index of the immersion medium of the second objective 232. This principle is referred to as the refocus rule. $M_{RR}$ is given by Equation (9) below.

$$M_{RR} = M_1 M_2^{-1} \quad (9)$$

In Equation 9, $M_1$ is the magnification of the microscope module 202 (produced by a combination of the first objective 210 and the first lens 212, also referred to herein as the "first microscope") and $M_2$ is the magnification of the combination of the second lens 228 and the second objective 230 (also referred to herein as the "second microscope"). As noted above, the combination of the third objective 232 and the third lens 234 may be referred to herein as the "third microscope." For each of the first, second, and third microscopes, the magnification of the respective microscope, $M_x$, is given by Equation (10) below, where x=1, 2, 3.

$$M_x = f_{TLx}/f_{Objx} \quad (10)$$

In Equation (10), $f_{TLx}$ is the focal length of the respective lens, and $f_{Objx}$ is the focal length of the respective objective.

Thus, from Equation (9) above, the refocus rule can be specified as follows:

$$M_{RR} = M_1 M_2^{-1} = n_1/n_2 \quad (11)$$

In addition, referring to FIG. 2A, according to certain aspects and embodiments, a further condition may be applied, namely that back focal plane (BFP$_2$) of the second objective is sized according to Equation (12):

$$BFP_2 \geq M_{BFP} BFP_1 \quad (12)$$

The magnification from the first back focal plane to the second back focal plane, $M_{BFP}$, is given by the ratio of the focal lengths of the second lens 228 and the first lens 212.

$$M_{BFP} = f_{TL2}/f_{TL1} \quad (13)$$

The diameter of the back focal plane of any of the objectives (BFP$_x$; x=1, 2, 3) is related to the corresponding numerical aperture and focal length of the objective according to:

$$BFP_x = 2f_{Objx} NA_x \quad (14)$$

If the parameters of the first microscope are known (e.g., $f_{Obj1}$, $d_1$, $f_{TL1}$), the components and parameters of the second microscope can be selected or configured to appropriately position BFP$_2$. Thus, step 404 may include selecting or configuring the second objective 230 by applying a combination of the refocus condition specified in Equation (11) and the additional condition set forth in Equation (12). Applying these two conditions together and considering Equation (1) above gives the following condition:

$$\sin \theta_2 \geq \sin \theta_1 \quad (15)$$

From Equation (1) above, the condition of Equation (15) can be equivalently stated as:

$$NA_2/n_2 \geq NA_1/n_1 \quad (16)$$

The condition stated in Equation (16) expresses the preference for the second objective 230 to capture all light rays from the first objective 210, thereby avoiding any loss in the overall numerical aperture of the microscopy system 200 and associated loss of imaging resolution and optical efficiency.

Referring to FIG. 4, the design process for the microscopy system 200 may include step 406 of selecting the microscope module 202. As discussed above, a standard/existing microscope stand may be selected, preferably having the first lens 212 and the first objective 210 being fully infinity corrected lenses that approximate ideal lens behavior. Furthermore, as discussed above, the microscope module 202 can be selected or configured in step 402 such that the first objective 210 meets the conditions NA$_1 \gtrsim n_0$ for typical samples that are expected to be imaged, and $n_1 \approx n_0$. Thus, the focal length of the first objective, $f_{Obj1}$ and the focal length of the first lens, $f_{TL1}$, set the primary magnification, $M_1$. As discussed above, in step 404, parameters of the second objective 230 can be configured to enforce the refocus conditions to minimize aberrations. For example, the focal length of the second objective, $f_{Obj2}$ and the focal length of the second lens, $f_{TL2}$, may be constrained by Equations (10), (11), and (15) to achieve a fixed value for $M_{BFP}$. The distance $d_1$ may not be readily configurable, particularly if the microscope module 202 is an existing microscope stand, but may be accurately measured such that other parameters can be selected based on the known distance $d_1$. For example, the distance $d_2$ can be adjusted to image BFP$_1$ to BFP$_2$ by using the following relationship:

$$d_2 = f_{TL2} + (f_{TL1} - d_1) M_{BFP}^2 \quad (17)$$

This approach makes embodiments of the oblique plane light-sheet microscopy system 200 compatible with a wide variety of commercially available microscope modules 202.

As discussed above, according to certain embodiments, the third objective 232 is configured such that its numerical aperture NA$_3$ equals or exceeds the refractive index, $n_2$, of the immersion medium of the second objective 230 (NA$_3 \geq n_2$) so as to maintain the highest potential overall numerical aperture for the emission/collection path, NA$_{em}$ expressed in Equation (7) above. This condition maximizes the collection efficiency of the third objective 232, and ensures that the third objective 232 is capable of capturing all the light from the second objective 230. Step 408 in FIG. 4. However, a large numerical aperture generally results in a short working distance for the microscope due to the large associated cone angles, which can make practical implementation very difficult. In certain examples, $\theta_1$ and $\theta_2$ may exceed 70°, for example. Thus, according to certain aspects, the requirements on the numerical aperture of the third objective 232 can be reduced by minimizing $n_2$ while also meeting the condition specified in Equation (15). Step 410 in FIG. 4.

Referring again to FIG. 2A, the oblique plane of the sample 206 is re-imaged by the combination of the third objective 232 and the third lens 234 to form an image of the sample 206 at the final image plane IP$_4$. In step 420, the overall system magnification, $M_T$ is given by Equation (18) below, and can be set to a desired value through appropriate selection of the focal length of the third lens, $f_{TL3}$, which is otherwise a free parameter. As discussed further below, the focal length of the third objective, $f_{Obj3}$, may be constrained by opto-mechanical specifications for the third objective 232.

$$M_T = M_{RR} \cdot M_3 \quad (18)$$

Light-sheet microscopy is generally useful for imaging live biological samples 206, which typically have values of $n_0$ in a range of about 1.35 to 1.40, and may have an average refractive index of approximately 1.37. Accordingly, to capture all possible light emitted in a typical live biological sample 206, set NA$_1 \gtrsim 1.40$. This can be achieved by using an oil immersion objective, which can be configured to a typical numerical aperture in a range of: 1.40<NA$_{oil}$<1.45. However, selecting an oil immersion objective for the first objective 210 results in an index mismatch between the immersion medium of the lens and the sample 206 ($n_1 \neq n_0$), which produces a depth (z) dependent spherical aberration that strongly degrades the image resolution. As discussed above, the first objective 210 can be selected and configured based on achieving a good compromise between getting the largest useful numerical aperture and maintaining a good index match. Accordingly, in certain embodiments, a silicone objective lens is selected for the first objective 210. In this case, NA$_1$=NA$_{silicone}$ (for example NA$_{silicone}$=1.35), and $n_1 = n_{silicone} = 1.41$. For a typical live biological sample 206 with the average $n_0$=1.37, this selection for the first objective 210 provides a delta in the numerical aperture ($\Delta$NA) of approximately 0.02 (as noted above, preferable NA$_1 \geq n_0$; here, this condition is not quite met, but the delta is very small, meaning that almost all the available light from the sample 206 can be collected by the first objective 210), and a delta or mismatch in the index (Δn) of only 0.04, which causes minimal depth-dependent aberrations. Thus, this selection may represent a good or even optimal compromise per the above. For comparison, a good water immersion objective has values of $NA_{water}=1.27$ and $n_{water}=1.33$, resulting in similar depth-dependent aberrations but a significantly lower collection ability (due to the lower numerical aperture). Further, as discussed above, a comparable oil immersion objective, while maximizing the numerical aperture (with $NA_{oil}=1.45$, for example), causes depth-dependent aberrations due to the mismatch in refractive index ($n_{oil}=1.52$, typically, and therefore the index delta is ~0.15) that strongly degrades the imaging performance at depth in the sample 206 and the associated volumetric information. Thus, the selection of a silicone objective lens or similar intermediate immersion index lens for the first objective 210 according to certain embodiments may provide significant advantages over water and oil objectives.

For example, in certain instances, a sample (such as a live biological sample) may have a refractive index in a range of $1.33<n_0<1.41$. Thus, selecting a silicone objective with $NA_1=1.35$ and $n_1=1.41$ provides "error" or tolerance ranges of $0.02 \le \Delta NA \le 0.06$ and $0 \le \Delta n \le 0.08$. Accordingly, in this case, $NA_1 \ge n_0$ (within the tolerance range of $\Delta NA$) and $n_1 \approx n_0$ (within the tolerance range of $\Delta n$), with these tolerance ranges being preferred limits in certain applications. In another example, the first objective 210 may be a glycerol immersion lens, with $NA_1=1.3$ and $n_1=1.46$. For the same sample range, this example provides error ranges of $0.03 \le \Delta NA \le 0.11$ and $0.05 \le \Delta n \le 0.13$. Although not as optimal as the silicone example, this choice (glycerol or a similar material) for the first objective may nonetheless represent an acceptable compromise or acceptable tolerance range for the desired conditions of $NA_1 \ge n_0$ and $n_1 \approx n_0$. In contrast, although choices for the first objective 210 that deviate further away from the above tolerance range examples may still operate for imaging live biological samples, the performance is further reduced, making such choices undesirable in many applications.

Once the objective lens (for example a silicone objective lens) is chosen for the first objective 210, the parameters $NA_1$ and $n_1$ (for example, $NA_1=1.35$ and $n_1=1.41$) are known. Thus, for this example, applying the condition of Equation (16) sets the ratio of the numerical aperture of the second objective to the index of refraction of the second objective $NA_2/n_2 \ge 0.96$. As discussed above, it is desirable to minimize $n_2$ to relax the requirements on the numerical aperture of the third objective 232, since it is preferable that $NA_3 \ge n_2$ to maximize the collection efficiency. Accordingly, the second objective 230 can be an air objective ($n_2=1.0$) with $NA_2=0.95$, which is capable of reimaging 99% of the angular range of the first (silicone) objective 210 (a sin (0.95)/a sin(0.96)).

Examples of the microscopy system 200 designed and configured according to the above process and principles achieve significant improvements in collection efficiency over what can be achieved by the systems disclosed by Dunsby and Yang. In the following examples, the illumination light beam 216 is assumed to have a divergence angle of $\Phi_{ex}=5°$. For example, assuming the sample 206 has $n_0=1.37$, an embodiment of the microscopy system 200 in which the first objective 210 is a silicone immersion lens with $NA_1=1.35$ and $n_1=1.41$, and the second objective is an air objective with $NA_2=0.95$ and $n_2=1.0$, achieves $NA_{em}=1.32$ (applying Equation (7) above), very close to the 1.37 limit achievable with conventional high-resolution microscopy, and (neglecting reflective losses) the collection efficiency is 95%. In contrast, Dunsby discloses systems that achieve far lower overall numerical apertures and very low collection efficiency. For example, Dunsby discloses a system in which both the first and second objectives are air objectives with $NA_1=NA_2=0.95$ that theoretically has an overall numerical aperture, $NA_{tot}$, of only 0.75 and a collection efficiency of only 63%. Another example disclosed in Dunsby uses a water objective for the first objective ($NA_1=1.2$; $NA_2=0.95$), but theoretically achieves an overall numerical aperture, $NA_{tot}$, of only 0.74 and has a very poor collection efficiency of only 38%. Similarly, the examples disclosed in Yang do not achieve anywhere near the performance of embodiments of the microscopy system 200 disclosed herein. For example, Yang discloses an example in which the first objective is a water objective with $NA_1=1.27$ and the second objective is an air objective with $NA_2=0.9$. This example theoretically provides an overall system numerical aperture of 1.17 and a collection efficiency of 85%; significantly lower that the example of the microscopy system 200 discussed above. Further, Yang discloses that in practice this example actually achieved an overall system numerical aperture of only ~1.06 and a collection efficiency of only ~70%. It is worth noting that, as demonstrated by this example, Yang did not achieve the benefits of ensuring that the second objective is configured to collect essentially all the light from the first objective.

In addition to the considerations discussed above that may be applied when selecting and configuring the first and second objectives, certain aspects further recognize that the tilt angle, α, of the third objective 232 can be optimized. Applying the conditions of Equations (11) and (15) may result in the second objective 230 having a short working distance due to the large cone angle, $\theta_2$, set by the high desired numerical aperture, $NA_2$. If the optical axis of the third objective 232 were parallel to the optical axis of the second objective 230 (α=0), the short working distance would not present an issue; however, as discussed above, the optical axis of the third objective 232 is tilted by an angle α (generally nonzero) relative to the optical axis of the first and second objectives 210, 230 so as to effectively image a plane that contains the illumination light-sheet 216. Accordingly, certain aspects of the present invention are directed to appropriately selecting the tilt angle, α, and properties of the third objective 232 in view of these considerations and the goal of maximizing $NA_{em}$. Steps 412, 414, 416 in FIG. 4.

As discussed above with reference to FIG. 3, the light-sheet 216 has a divergence angle of $\Phi_{ex}$. The tilt angle α is related to both the light-sheet divergence angle and the collection cone of the first objective 210, and can be calculated according to Equation (19):

$$\alpha = \pi/2 + \Phi_{ex} - \theta_1 \quad (19)$$

Figure 5:
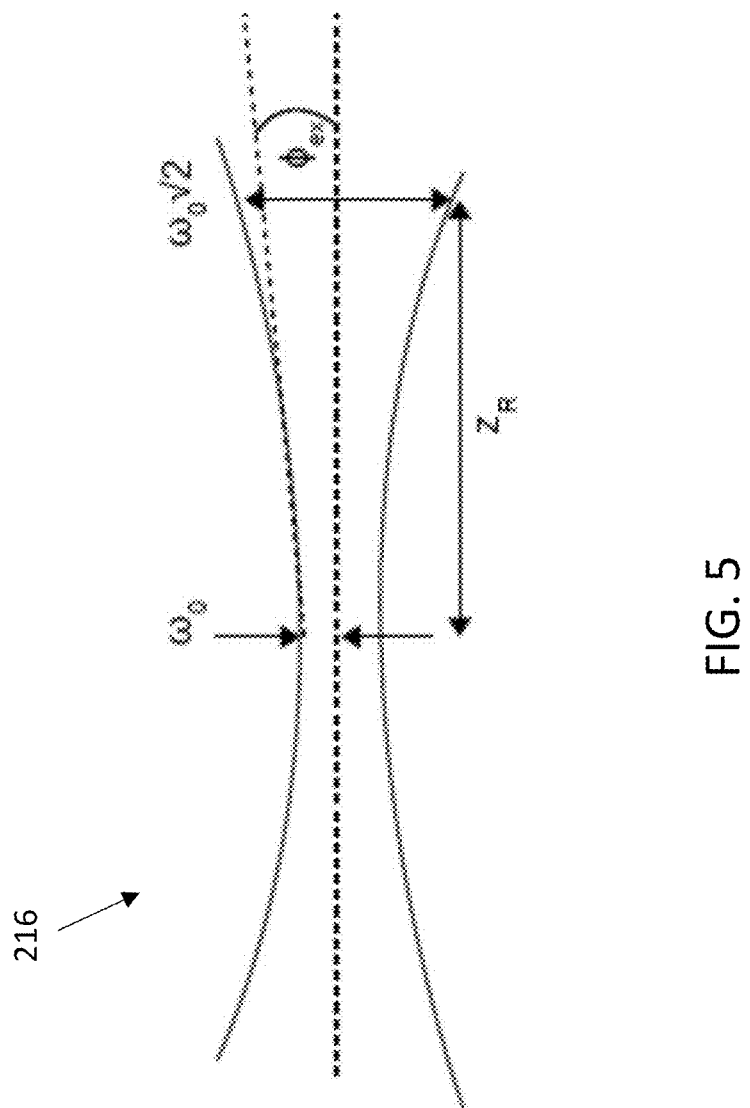
FIG. 5 is a diagram illustrating parameters of an example of an illumination light-sheet.

The divergence angle, $\theta_{ex}$, and therefore the tilt angle, α, are related to various properties of the illumination beam (light-sheet) 216. FIG. 5 is a diagram illustrating parameters of an example of the light-sheet 216. In this example the light-sheet is a Gaussian beam. The light-sheet 216 has a beam waist of $\omega_0$. The Rayleigh range, $Z_R$, is the distance over which the beam diverges to a width of $\omega_0\sqrt{2}$. The beam waist, $\omega_0$, can be expressed as a function of the wavelength, $\lambda_{ex}$, of the light-sheet 216 and the Rayleigh range:

$$\omega_0 = \sqrt{(Z_R \lambda_{ex})/\pi} \quad (20)$$

Further, $$\Phi_{ex} = a\sin(\lambda_{ex}/(n_0 \pi \omega_0)) \quad (21)$$

For biological imaging, a typical value for the wavelength of the light-sheet 216 is 0.5 micrometers (μm), and, assuming a laser light source 214, the Rayleigh range, $Z_R$, is typically in a range of approximately 5 to 50 μm. Thus, the beam waist, $\omega_0$, may generally be in a range of about 1 to 3 μm, and the divergence angle, $\Phi_{ex}$, may therefore be in a range of about 2° to 8°, assuming $n_0 \approx 1.37$ (as in examples discussed above). Given these parameters, and the values of $\theta_1$ and $\theta_2$ determined from the considerations and examples discussed above, for these examples Equation (19) indicates that the tilt angle α may be in a range of about 20° to 26°. To illustrate, consider the following example in which the sample 206 is a live biological sample with $n_0=1.37$, $\Phi_{ex}=5°$, and the first objective 210 is a silicone objective with $NA_1=1.35$ and $n_1=1.41$. In this example, Equation (3) gives $\theta_1 \approx 73°$. Thus, applying Equation (18), this example specifies $\alpha \approx 22°$.

Based on Equation (19), the maximum divergence angle, $\Phi_{ex}$, expected given the light-sheet 216 to be used sets a maximum value for the tilt angle, α. Using a higher tilt angle reduces the emission path collection angle, $\Phi'_{em}$, and therefore also $NA_{em}$, with no obvious benefit. Thus, according to certain aspects, knowing the properties of the light-sheet 216 being used, and the collection cone angle of the first objective 210, $\theta_1$, the tilt angle, α, can be chosen to optimize collection efficiency (step 412). This aspect leverages an important realization, not exploited by either Dunsby or Yang, that there is an optimal range or value for the tilt angle, α, that is dependent on the parameters of the light-sheet 216 and of the first and second objectives 210, 230 (which in turn can be optimized based on the sample 206 to be imaged, as discussed above). For example, as noted above, Yang discloses that the tilt angle of the third objective is 30°; however, in view of the principles and aspects disclosed herein, it may be appreciated that Yang's recommended value for the tilt angle is too high. Applying the equations above, it can be shown that given the other parameters disclosed in Yang (e.g., $Z_R=35$ μm; $\Phi_{ex}=3°$), the optimal value for the tilt angle is approximately 21°, significantly lower than the value disclosed by Yang.

As discussed above, the constraints on the second objective 230 result in a high angular range (e.g., $\theta_2 > 70°$), and therefore (given existing lenses) a short working distance. For example, if $\theta_2 \approx 72°$, the working distance may be approximately 200 μm. If the third objective 232 also has a short working distance, which is typical for lenses with a high numerical aperture, then this produces an awkward mechanical constraint on the tilt angle, α. For example, if the third objective 232 were to be an air objective with the same parameters as the second objective 230 (e.g., $NA_2=NA_3 \approx 0.95$ and $n_2=n_3=1.0$), the two objectives would collide at $\alpha \approx 6°$, which negates the operation of the microscope. Accordingly, certain aspects and embodiments are directed to configuring the third objective 232 to avoid this problem.

According to certain aspects, the immersion medium of the third objective 232 is selected to have a relatively high refractive index in order to reduce the angular range, $\theta_3$. For example, the immersion medium of the third objective 232 may be oil-like, which typically has a refractive index in a range of 1.45 to 1.65; significantly higher than air. From Equation (1), for any given numerical aperture, the higher the refractive index of the objective lens, the lower the angular range. Reducing the angular range can in turn increase the working distance, relaxing mechanical constraints on the system. Step 414 in FIG. 4. For example, considering an oil-like objective having a slightly higher numerical aperture than the air second objective discussed above ($NA_3=1$ and $NA_2=0.95$) and a refractive index in the lower part of the range given above, the maximum angular range is then $\theta_3 \approx \sin(1/1.45) \approx 44°$. For this example, the working distance may typically be in a range of about 4 mm to 8 mm.

Figure 6A:
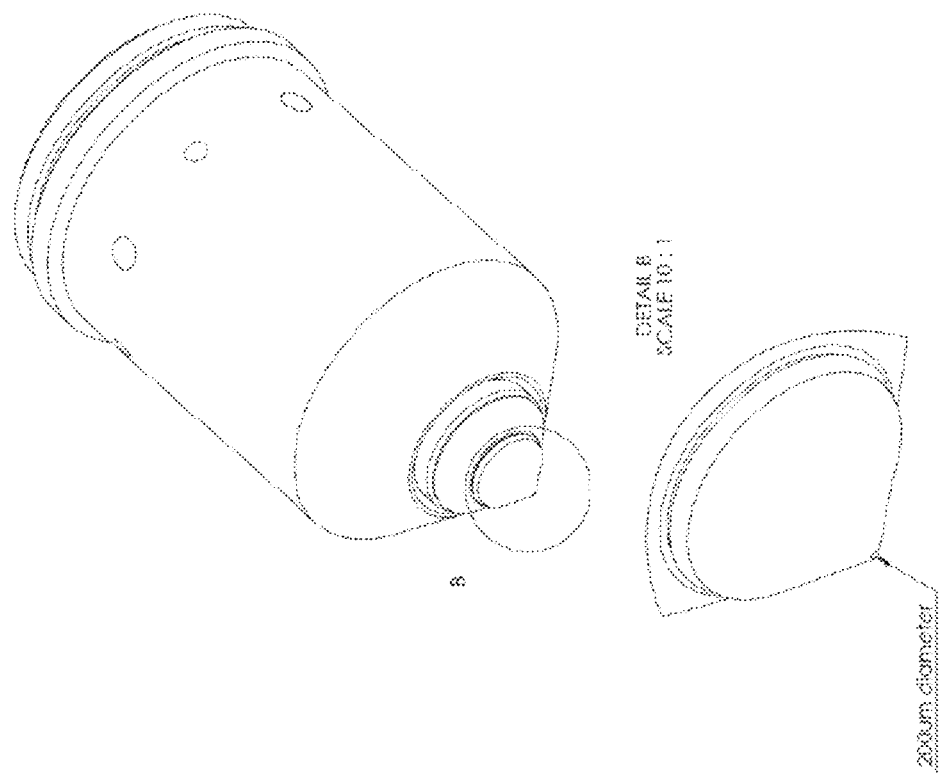
FIGS. 6A-C are diagrams of examples of a third objective that can be used in embodiments of the microscopy system of FIG. 2A according to aspects of the present invention.
Figure 6A:
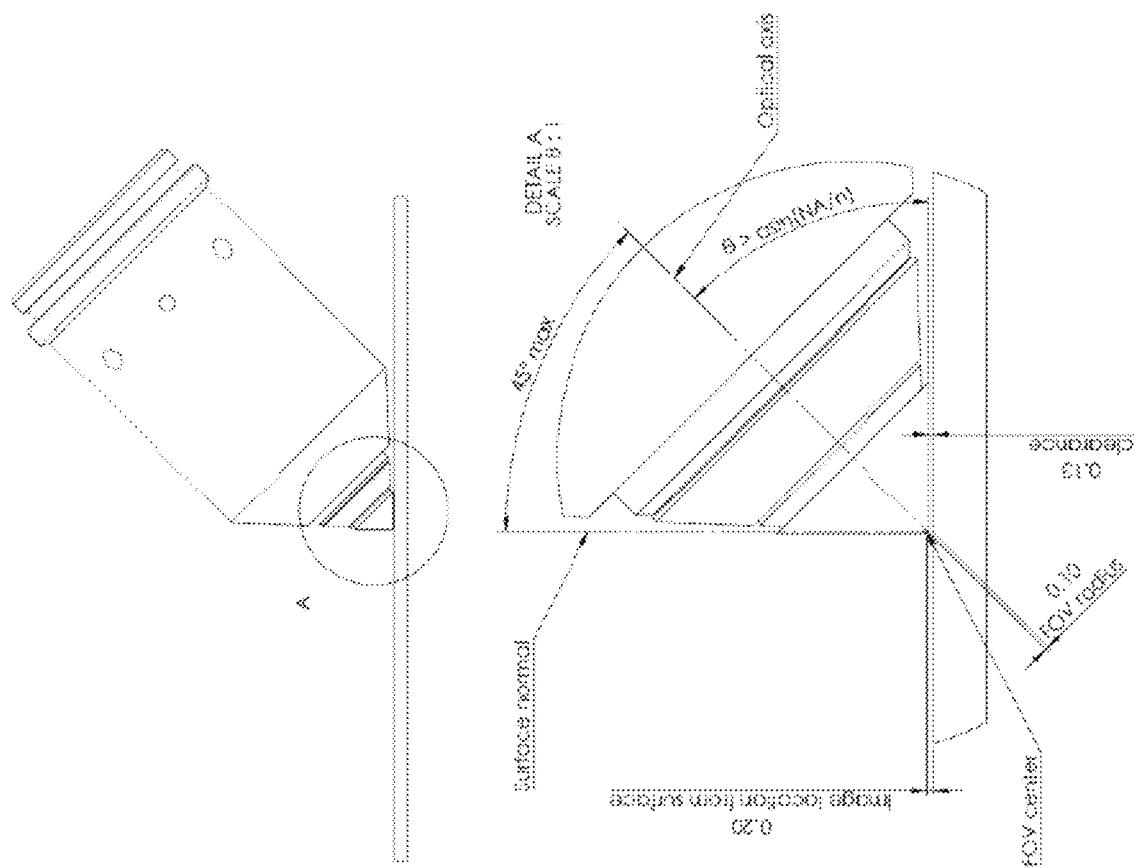
Figure 6B:
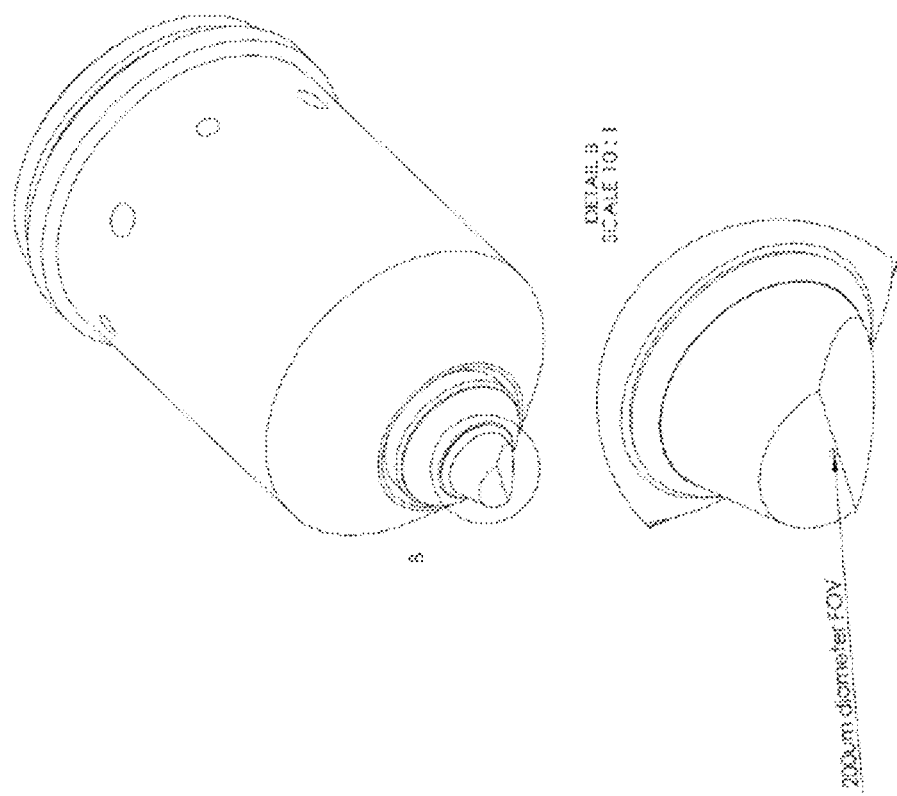
Figure 6B:
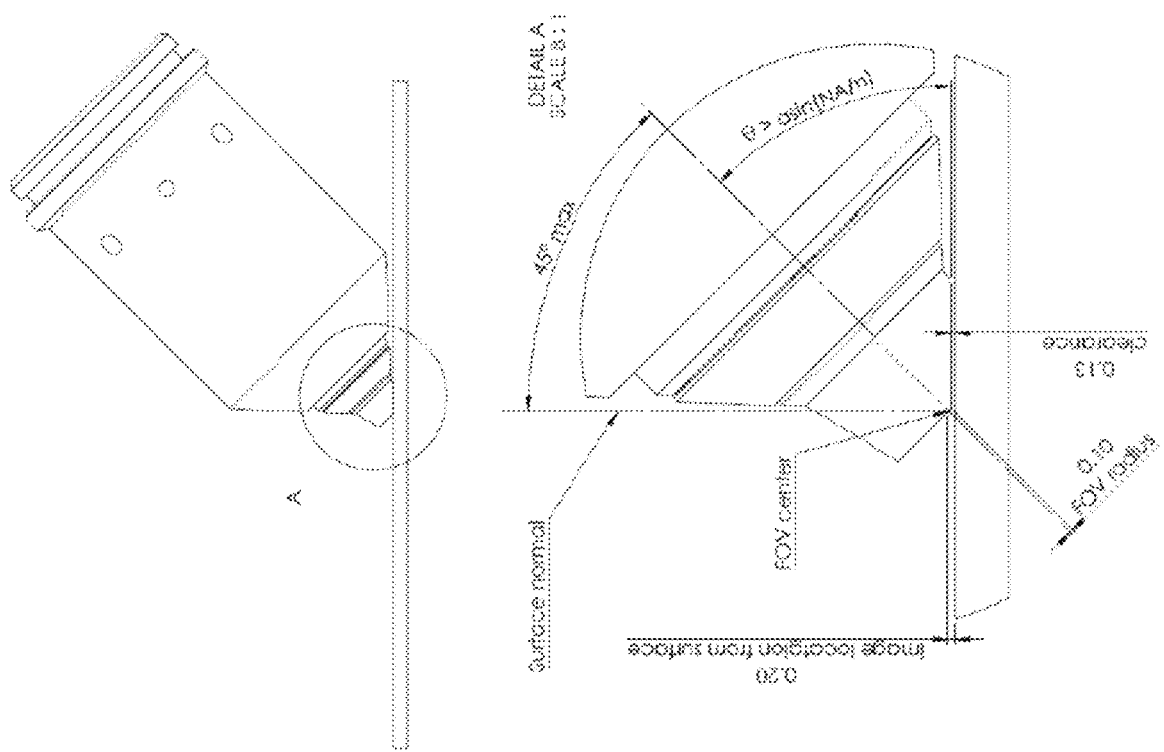
Figure 6C:
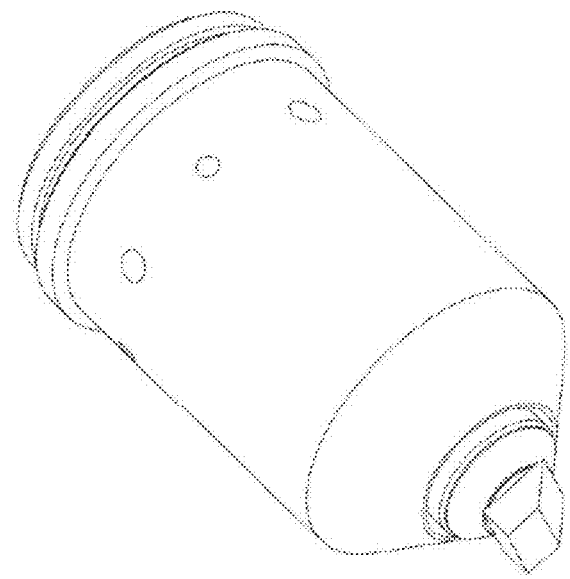
Figure 6C:
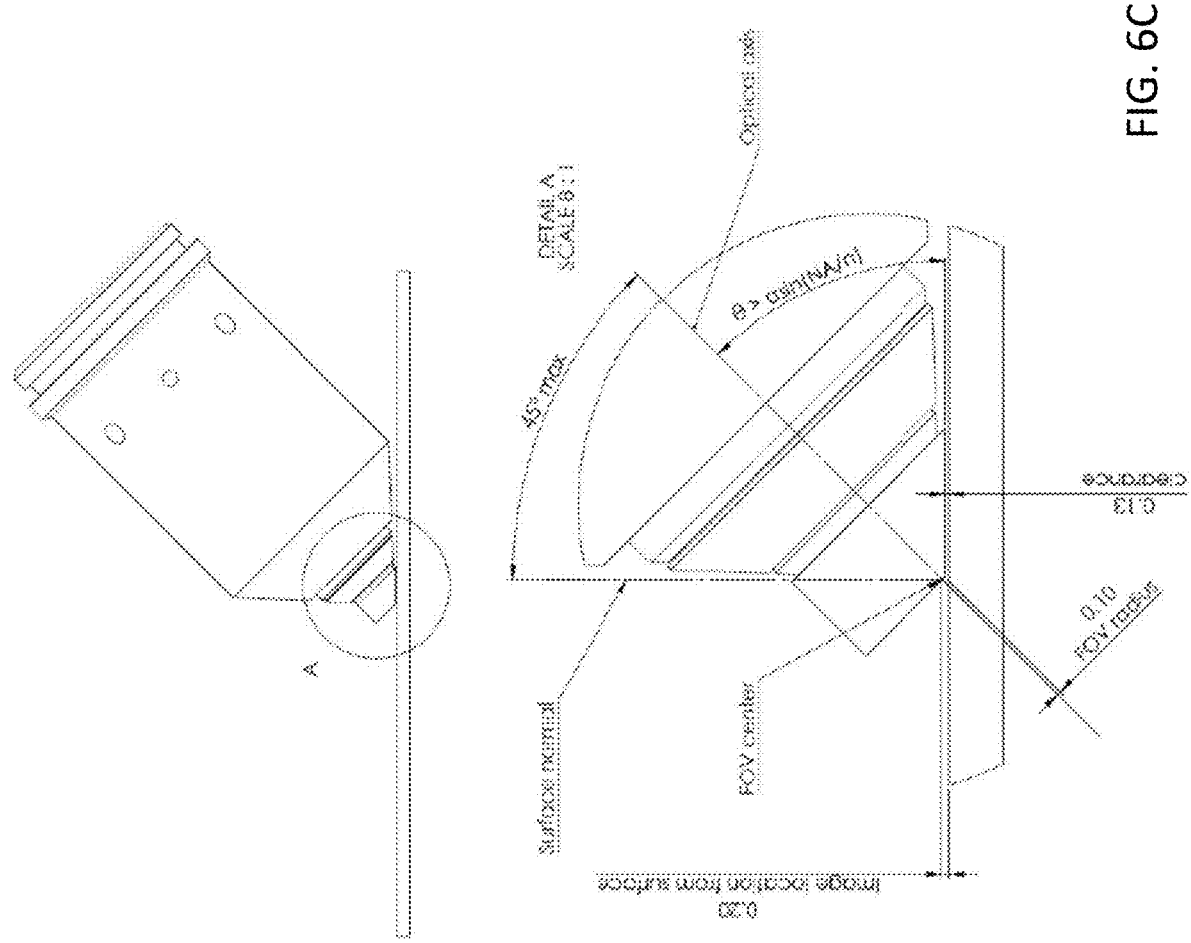

According to certain embodiments, the third objective 232 is configured both to use a material with a higher refractive index, such as glass, and have a mechanical arrangement that allows for a very short or even zero ("contact") or even negative working distance. Step 416 in FIG. 4. In one example, the third objective 232 is configured with a solid glass frontal "frustum" that is shaped to match the applicable field of view and with an angular acceptance that matches the required numerical aperture based on the condition of $NA_3 \geq n_2$ discussed above. Thus, in one example, $\theta_{frustum} > \theta_{max}$, where $\theta_{max}$ is the value of $\theta_3$ ($\approx 44°$ in certain examples) that is specified based on the numerical aperture, $NA_3$ of the third objective 232 (per Equation (1)) and the refractive index of the immersion medium of the third objective, $n_3$. This allows the third objective 232 to collect essentially all the light from the second objective 230, while also allowing a significant range of adjustment for the tilt angle, α, for example up to 45° for a glass frustum, to achieve the highest overall emission path numerical aperture, $NA_{em}$, for the oblique plane light-sheet microscopy system 200, without mechanical collision between objectives two and three. Examples of various configurations of the third objective 232 including a solid glass frustum or other shape are shown in FIGS. 6A-6C. The glass frustum can be conical in shape or have a double beveled chisel shape, for example. FIG. 6A illustrates an example of the third objective 232 with a solid radial frustum. FIG. 6B illustrates an example of the third objective 232 with a solid radial frustum with a bevel. FIG. 6C illustrates an example of the third objective 232 with a solid square frustum. Each of these examples allows for efficient light coupling over high numerical apertures, as discussed further below.

Thus, in certain examples, the third objective 232 can include a solid glass frustum that is shaped to allow for a zero or close to zero (e.g., ~20 μm in air) working distance. In certain examples, the frustum has an approximately 200 μm field of view and a glass tip that has a similar dimension. A 20 μm working distance allows a light-sheet 216 with a divergence angle, $\Phi_{ex}$, of up to about 8° to cross the front of the frustum of the third objective 232 in air and therefore be coupled directly into the second objective 230 at a high numerical aperture.

As discussed above, the optimal value or range for the tilt angle, α, may depend in part on parameters of the light-sheet 216. However, it may be desirable to use the same microscopy system 200 to image a variety of different samples 206, and different light-sheet parameters may be preferred for imaging different types of samples. For example, large samples may be better imaged using a large field of view and a weakly diverging Gaussian light-sheet 216. In other words, in this case it may be preferable to configure the system 200 with a minimal tilt angle, $\alpha_{min}$, and use a light-sheet 216 with a minimal divergence angle $\Phi_{ex\_min}$. Small samples 206 on the other hand, may be better imaged using a small field of view and a Gaussian light-sheet 216 with a narrow beam waist, (meaning a large tilt angle, $\alpha_{max}$ and a large divergence angle, $\Phi_{ex\_max}$). It may also be desirable to use non-Gaussian illumination beams (for example Bessel beams or even lattice beams). Accordingly, in certain examples, a portion of the imaging module 204 can be configured with a mechanical assembly that allows at least the third objective 232, the third lens 234, and the detector 226 to rotate as a rigid object about an intersection of the second intermediate image plane, $IP_2$, and the third intermediate image plane, $IP_3$, such that the tilt angle, α, can be dynamically adjusted and optimized for different samples 206. Step 418 in FIG. 4.

Figure 7:
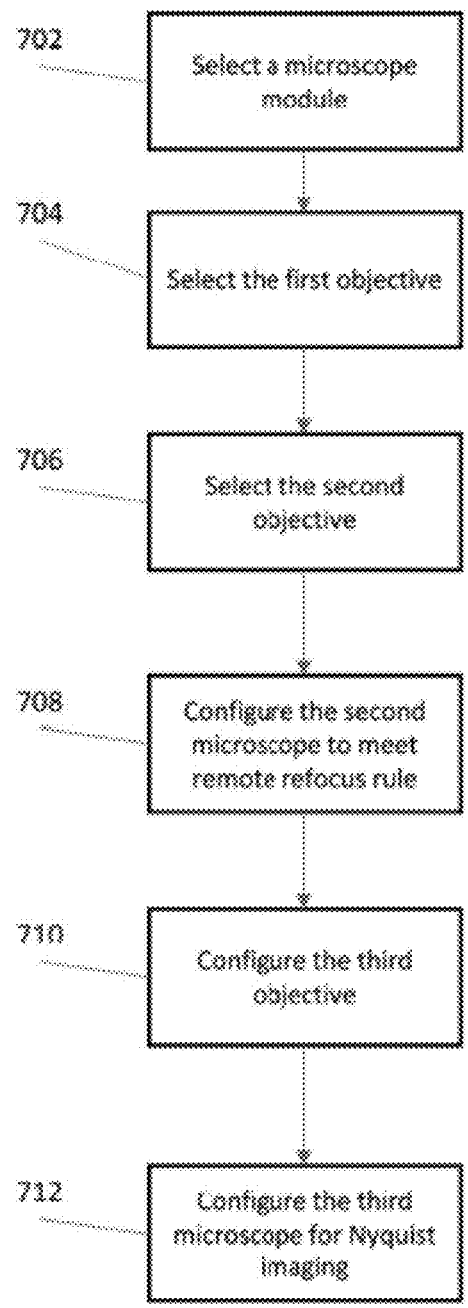
FIG. 7 is a flow diagram of one example of a method for configuring a microscopy system according to aspects of the present invention.

FIG. 7 is a flow diagram summarizing an approach to configuring an oblique plane microscopy system 200 in accord with the processes and considerations discussed above. Steps 702 and 704 involve selecting/configuring the first microscope in the microscopy system 200. Step 702 corresponds to step 406 discussed above, in which a base microscope module 202 is selected. The microscope module 202 includes an embedded first lens 212, and therefore the parameters $f_{TL1}$ and $d_1$ may be fixed by this selection. In step 704, the first objective 210 for the microscope module 202 is selected to match the type of sample expected to be imaged using the microscopy system 200. As discussed above, the refractive index of the sample 206 may vary, but given a known application (e.g., biological imaging), the first objective 210 can be selected with a numerical aperture that is approximately greater than or equal to the average or approximate refractive index of the expected sample type, thus setting $NA_1 \gtrsim n_0$, as discussed above. Selection of the first objective 210 sets the parameter $f_{Obj1}$, and therefore the combination of steps 702 and 704 fixes the magnification of the first microscope, $M_1$.

Steps 706 and 708 involve selecting/configuring the second microscope in the microscopy system 200. Step 706 includes selecting the second objective 230. As discussed above, the requirements on the third objective 232 can be relaxed by minimizing $n_2$. The parameter $n_2$ may vary anywhere between 1.0 for air and over 1.4 for oil-like materials, or even up to 2.0 or higher for high-index glass materials. Accordingly, selecting an air objective for the second objective minimizes $n_2$, while also meeting the condition specified in Equations (15) or (16). Air objectives have a numerical aperture of less than 1.0. In practice, the best air objectives may have $NA_2 \approx 0.95$ (corresponding to $\theta_2 \approx 72°$). Selecting the second objective 230 within the aforementioned constraints sets the parameter $f_{Obj2}$. Step 708 includes configuring the second microscope to achieve the remote refocus condition stated in Equation (11) above. As discussed above, $M_1$ is set in steps 702 and 704. From Equation (10), the only free parameter that can be used to set $M_2$ is $f_{TL2}$ because $f_{Obj2}$ is set by the conditions considered in step 706. Thus, in step 708, $f_{TL2}$ can be selected to meet the remote refocus condition of Equation (11). As a result, the only remaining free parameter in the first and second microscopes is now $d_2$. As discussed above, in certain examples, $d_2$ may be selected according to Equation (17) to achieve best imaging performance.

Steps 710 and 712 involve selecting/configuring the third microscope in the microscopy system 200. Step 710 includes selecting the third objective 232 to collect all (or as much as possible of) the light from the second objective 230 and allow for the tilt α, which may be optionally dynamically adjustable as discussed above. To achieve both these conditions, set $NA_3 \geq n_2$, since this will ensure that the third objective 232 is capable of collecting all or nearly all the light from the second objective 230 even with the tilt α (i.e., the third objective 232 can capture all or nearly all the cone angle from the second objective 230 plus α). According to certain examples, achieving the light collection with the α tilt is done by using an objective that is mechanically configured to allow it to be positioned to capture the light cone from the second objective 230 while also accommodating the rotation/tilt of α. For example, the third objective 232 may include a solid glass frustum with a beveled or other shaped edge, as discussed above. This configuration allows the third objective 232 to extend into the field of the second objective (using the pointed glass tip) and therefore collect all or nearly all the light from the second objective 230, while also allowing for rotation (α) of up to 45° (or more depending on the exact design). Step 710 sets the parameter $f_{Obj3}$, at least to a certain degree. Therefore, step 712 may include configuring the third microscope to set $f_{TL3}$ to specify the overall system magnification, $M_T$, at the correct value for the detector 226 (by achieving Nyquist sampling for example when using a multi-pixel detector).

According to certain embodiments, the first intermediate image plane, $IP_1$, can be used as an insertion point for the light-sheet 216, as shown in FIG. 2B. In addition, in certain embodiments, an x-y scan of the light-sheet 216 can also be introduced to provide synchronized volumetric imaging. The second objective 230 may also be used to scan a volume in the z direction by refocusing the image at the second intermediate image plane, $IP_2$, which is then collected by the third objective 232 at the third intermediate image plane, $IP_3$. Applying this approach, flexible volume options with x-y-z scanning can be achieved. For example, an x-y scan can be performed, and adjustment in the z direction can then be used to image another volume at a different depth in the sample 206. Thus, the overall volumetric capacity or flexibility of the microscopy system 200 can be increased. In certain examples, due to the tilt angle, α, the optical axis of the image of the sample 206 may not fall on any of the primary x, y, or z axes. Therefore, a pure x-y scan or a pure z scan may result in a shift of the light-sheet beam waist, $\omega_0$, relative to the sample 206, as the volume is collected using these individual axes. However, in certain examples, an x-y scan may be combined with a z scan of the correct amplitude such that a volume can be imaged with the light-sheet beam waist remaining centered on the field of view during the scan to give optimum sectioning and resolution throughout the volume.

As discussed above, in certain examples the third objective 232 can be configured with a glass frustum and tip that allows the light-sheet 216 to be coupled directly into the second objective 230 at a high numerical aperture. This allows for dichroic-free operation (i.e., the beam coupling element 218 in FIG. 2B can be eliminated. In addition, in examples where the second objective 230 is used to provide a volumetric image via a remote refocused z scan, as discussed above, this approach also provides inherent synchronization for scanning.

EXAMPLE 1

The following provides an example of a module, implemented in accord with the above-discussed aspects and embodiments, that can be coupled to a standard microscope to convert the microscope into a high numerical aperture light-sheet microscope that uses only one objective at the sample.

Figure 8:
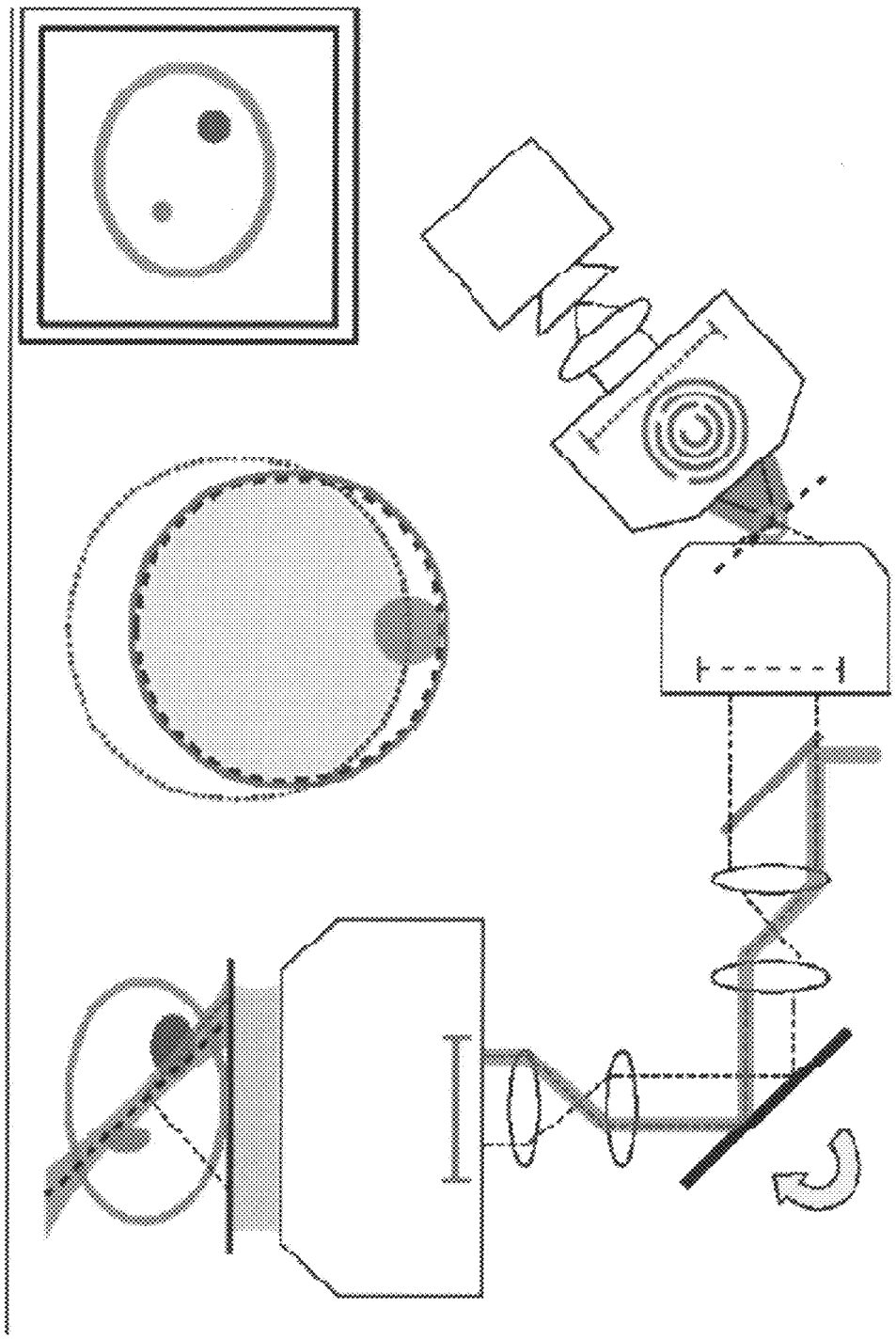
FIG. 8 is a diagram showing the emission path of one example of the system of FIG. 2A according to aspects of the present invention.

FIG. 8 is an illustration of the concepts of an example of a single-objective light-sheet microscope in accord with aspects and embodiments disclosed herein. A primary objective/tube lens pair (red solid line/circle indicates the back focal plane (BFP) of the objective) images a 3D biological sample to an intermediate space. A scanning system relays this 3D image to another intermediate space, where it is collected by a second tube lens/objective pair (blue dashed BFP). The second objective creates an aberration-free 3D copy of the sample at near-unity magnification. This virtual 3D sample is then re-imaged via a third, tilted microscope (green dotted BFP) which tilts the primary image plane. A light-sheet is coupled into the primary objective in this tilted image plane (red solid beam) yielding a single-objective light-sheet microscope. Moving a single scanning mirror rapidly acquires 3D volumes. The three objective BFPs are imaged onto each other as shown by the red solid, blue dashed, and green dotted circles. The red solid disk indicates the light-sheet footprint at the BFP, and the yellow solid region indicates the collection numerical aperture of the system. The design sacrifices no appreciable amount of the yellow area, with almost no measurable loss in resolution.

Figure 9B:
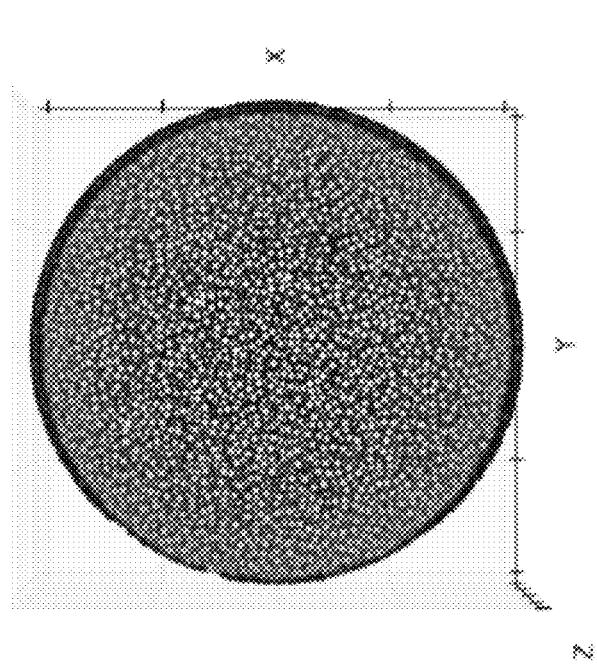
FIGS. 9A and 9B are diagrams showing angular ray transmission paths for a theoretical model of an example of the system of FIG. 8.
Figure 9A:
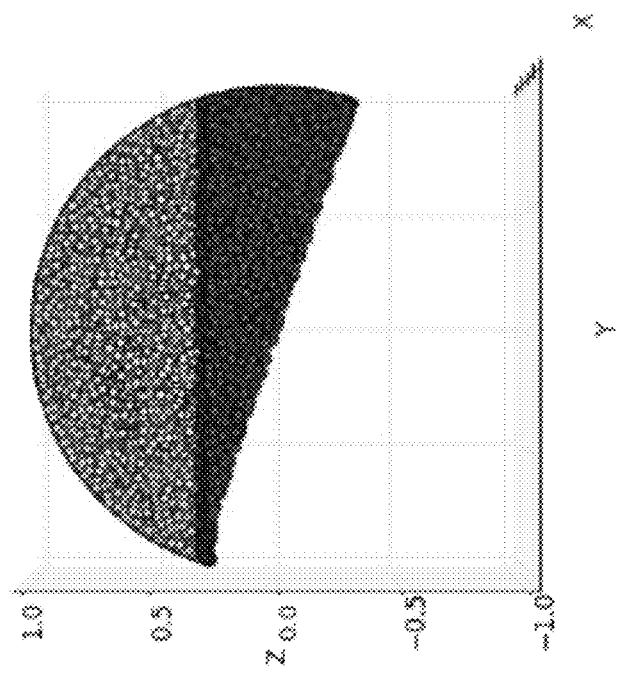

FIGS. 9A and 8B are diagrams further illustrating this feature by showing ray transmission angles for objectives in the system of FIG. 2A. Specifically, FIGS. 9A and 9B illustrate a theoretical model showing the angular passbands of the primary (first) objective 210 (red dots), the third objective 232 (green dots), and the combination of the first, second, and third objectives (yellow dots). The angular passband of the second objective 230 is not visible in FIGS. 9A and 9B. FIGS. 9A an 9B are 3D equivalents of the red, blue, green, and yellow circular regions shown in the top center portion of FIG. 8. Each yellow dot on the surface of the illustrated sphere represents a ray angle that can propagate from a point source in the sample, through the three objective lenses, and reach the detector. Each red dot represents a ray that is collected by the first objective lens (1.35 NA silicon in this example), but clipped by the second objective (0.95 NA air in this example). Each green dot indicates a ray that the third objective (1.0 NA glass in this example) could have collected if the second objective had produced it. The yellow region almost entirely fills the red region, demonstrating that the system transmits almost all the rays collected by the first objective. In this example, >95% of the rays collected by the first objective can pass to the second objective, and >99% of the rays collected by the second objective can pass to the third objective, providing a numerical aperture of ~1.33.

It should be noted that this number for overall numerical aperture is influenced by the design of each objective in the system. For example, if the primary objective were selected with NA=1.33 instead of 1.35, the >99% of the rays collected by first objective may pass to the second and third objectives. In practice, rays at the very edge of the numerical aperture of the primary objective may be aberrated and may not contribute to improved resolution. Thus, it can be beneficial to differentiate between the specified numerical aperture (rays that are collected) and the useful numerical aperture (rays that contribute to improved resolution). Examples of the system disclosed herein may capture >99% of the useful numerical aperture of the primary objective. Further, by replacing the second objective with a 0.96 NA air objective, >99% of the primary objective's specified 1.35 NA rays could be collected.

Figure 10:
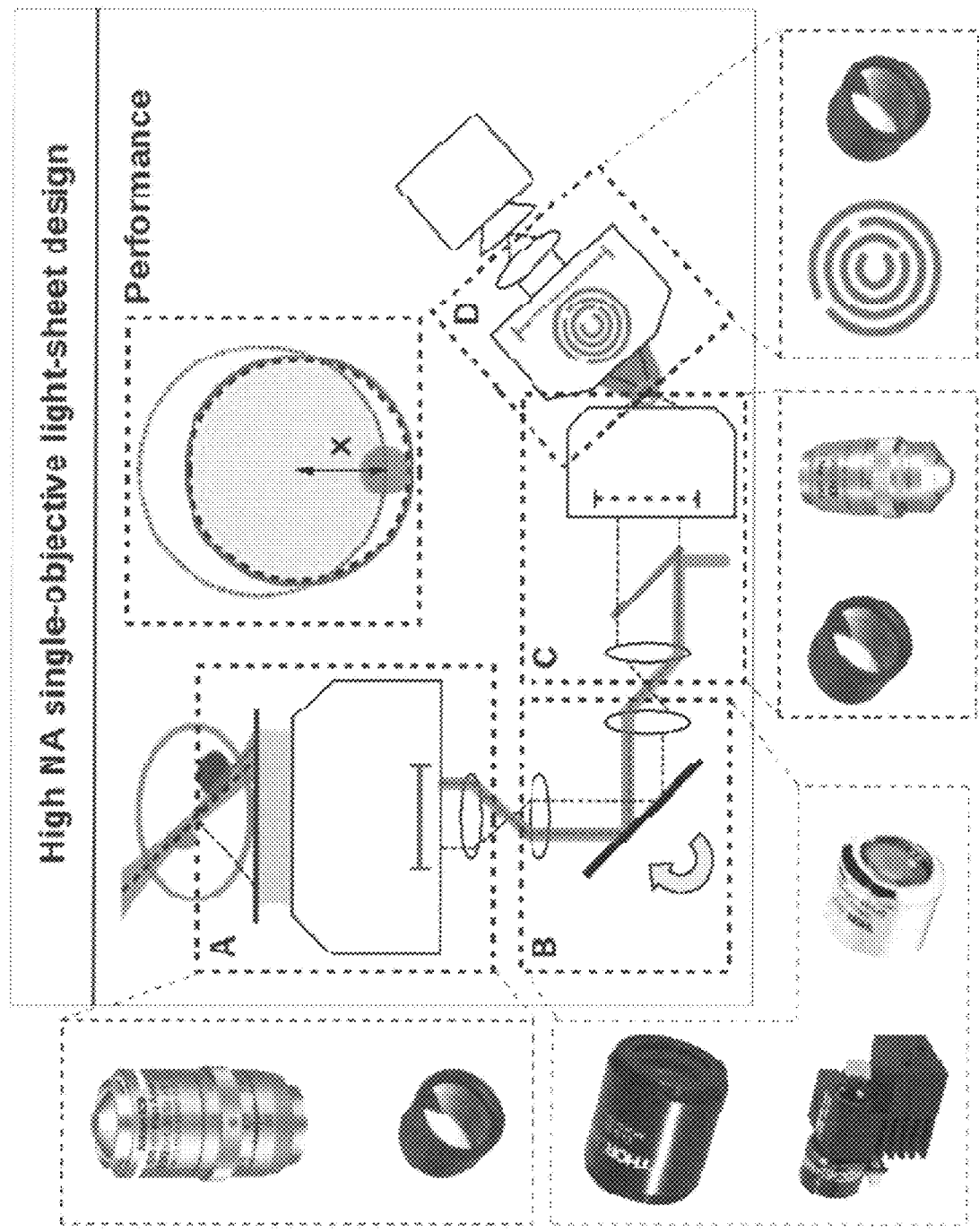
FIG. 10 is a diagram showing the emission path of an example of the system of FIG. 8 according to aspects of the present invention.

FIG. 10 illustrates an example of a simple, low cost design for the system of FIG. 8 with uncompromised spatio-temporal performance. FIG. 10 shows a breakdown of the components of the example of the system. Box A is a simple objective/tube lens pair, which may be a standard microscope stand. The primary objective is chosen to have a high numerical aperture and intermediate index that is optimal for imaging deep into live biological samples at high resolution. Box B is a scanning relay with a single galvo mirror that can rapidly take volume images. Box C is another tube lens/objective pair that, together with box B, perfectly match the requirements of box A. Box D is a specially-configured objective/tube lens pair that solves the opto-mechanical difficulties that may otherwise be present in the system.

Figure 11:
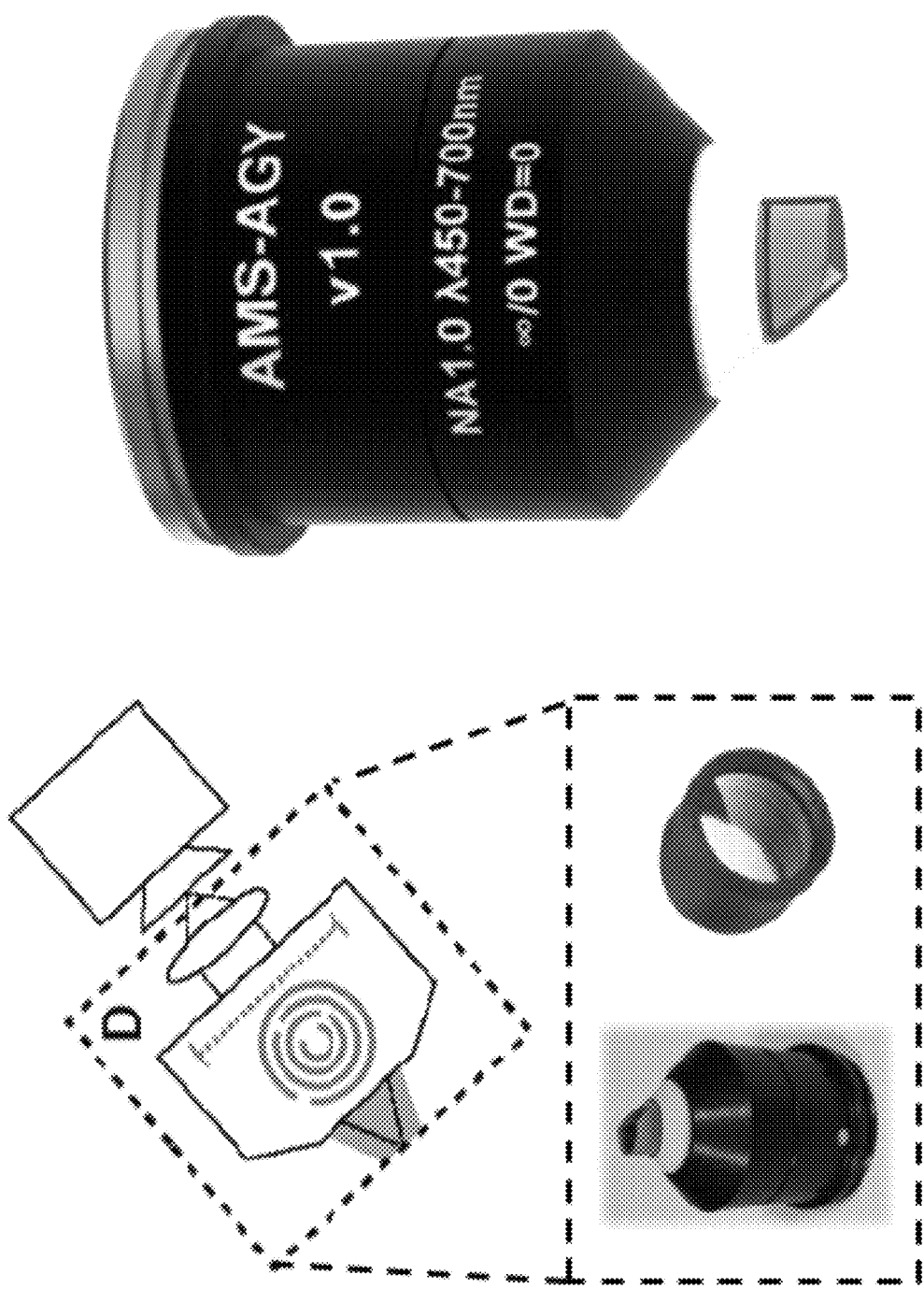
FIG. 11 is a diagram showing an example of the third objective that can be used in the systems of FIGS. 2A, 8, and 10 according to aspects of the present invention.
Figure 12A:
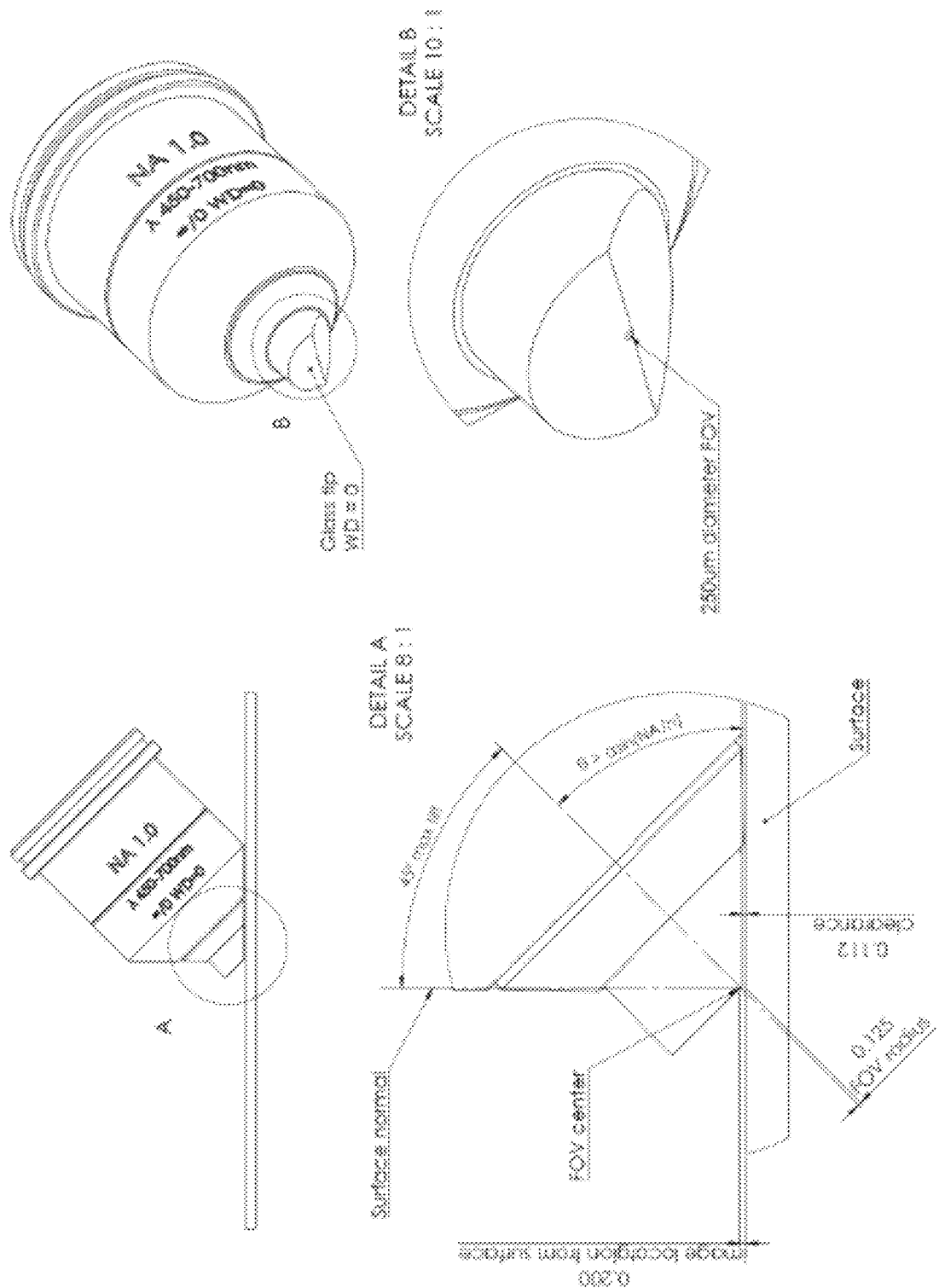
FIGS. 12A-C are diagrams showing an example of the third objective of FIG. 11 according to aspects of the present invention.
Figure 12C:
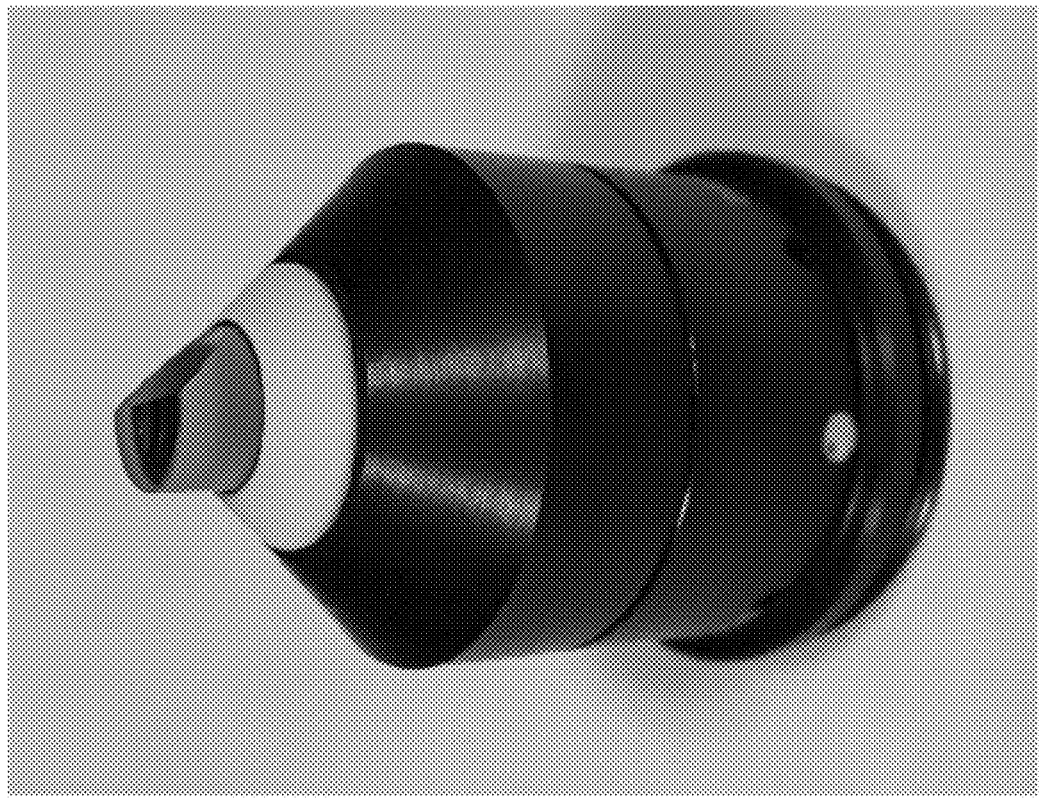
Figure 12B:

FIG. 11 is an illustration of an example of the specially-configured objective/tube lens pair of box D (also an example of the third objective discussed above), having a glass tip. FIGS. 12A-C further illustrate aspects of an example of the specially-configured glass-tipped objective configured to have an optical performance and geometry that allow it to extract a high resolution image as close as ~100 μm to a flat surface, with negligible loss in resolution and high transmission, over a range of tilt angles from 0-45 degrees. FIG. 12A is a drawing showing the opto-mechanically coupled design considerations of this example of the specially-configured objective to collect a tilted air space image just ~100 μm from a flat surface, with a range of tilt angles from 0-45 degrees. FIG. 12B is a corresponding CAD rendering of the example of the specially-configured objective, and FIG. 12C is a photograph of the example of the lens. Table 1 below provides specifications for an example of the lens corresponding to FIGS. 12A-C.

TABLE 1

| Specification | Description |
| --- | --- |
| NA = 1.0 | numerical aperture |
| ∞/0 | infinity corrected/coverslip thickness |
| WD = 0 | working distance |
| EFL = 5 mm | effective focal length (e.g. 40x with 200 mm tube lens) |
| λ = 450-700 nm | color correction |
| FOV (DL) = ø150 μm | diffraction limited field of view diameter |
| FOV (bevel) = ø250 μm | mechanically limited field of view diameter (1 direction only) |

An example of the emission path of the system of FIG. 10 was built, aligned and tested, with test data indicating that the system can image a 30 degree tilted plane with no measurable loss in resolution compared to a conventional microscope with the same primary objective. The example of the system of FIG. 10 used to obtain these results was configured according to the optics specifications set forth in Table 2 below. The optical elements are listed in Table 2 in the order of physical arrangement (from sample to camera). The system was used to image an Argolight SIM slide with a 488 nm laser excitation in a simple epi configuration. Coherent interference/speckle from the laser was tolerated. An additional Chroma ET525/50 emission filter was added immediately before the quad filter (item 12 in Table 2) to tighten up the emission band that is otherwise very broad. Image stacks were acquired by using a closed-loop piezo actuator at the second objective. The xy stage, primary objective, galvo, and third objective remained stationary during acquisition, and the camera exposure time and laser power were kept constant throughout.

TABLE 2

| Item # | Supplier | Part | Description | Qty |
|---|---|---|---|---|
| 1 | Biologist | Sample | Biological sample, preferably with a refractive index in the range: 1.35-1.4 (typical for live cells) | 1 |
| 2 | Nikon | MRD73950 | CFI60 Plan Apochromat Lambda S 100x Silicone Immersion Objective Lens, N.A. 1.35, W.D. 0.3 mm, F.O.V. 22 mm, Correction Collar 0.15-0.19 mm | 1 |
| 3 | Nikon | MXA22018 | CFI Second Lens Unit, Tube Lens Element, EFL = 200 mm | 3 |
| 4 | Thorlabs | CLS-SL | Scan Lens with Large Field of View, 400 to 750 nm, EFL = 70 mm | 1 |
| 5 | Thorlabs | GVS201 | 1D Galvo System, Broadband Mirror for 400-750 nm (-E02) | 1 |
| 6 | Thorlabs | LSM03-VIS | Scan Lens, 400 to 700 nm, EFL = 39 mm | 1 |
| 7 | Nikon | MXA22018 | (from above set of 3) | 0 |
| 8 | Chroma | ZT405/488/561/640rpcv2 | Quad band dichroic UF1 (26 × 38 × 1)mm (excitation coupling) | 1 |
| 9 | Nikon | MRD00405 | CFI60 Plan Apochromat Lambda 40x Objective Lens, N.A. 0.95, W.D. 0.17-0.25 mm. F.O.V. 25 mm, Correction Collar 0.11-0.23 mm | 1 |
| 10 | Mark Optics | N/A | Window, NBK-7, OD: 4 mm +/− 0.2 mm, Thk: (0.170 +/− 0.05) mm, polished both sides 40/20, TWE ¼ wave, parallelism <10 μm, coated both sides BBAR - VIS, $T_{avg}$ >99% @ 400 nm-700 nm @ 0° AOI | 1 |
| 11 | ASI | AMS-AGY v1.0 | Special glass-tipped objective | 1 |
| 12 | Chroma | ZET405/488/561/640m | Quad emission filter, 25 mm diameter mounted | 1 |
| 13 | Nikon | MXA22018 | (from above set of 3) | 0 |
| 14 | PCO | edge 4.2 | sCMOS camera, 2048 × 2048 pixels with 6.5 × 6.5 μm² size, 100 fps full field, TTL trigger <50 μs response | 1 |

To benchmark the emission path and evaluate the example of the specially-configured third objective (referred to below as the AMS-AGY v1.0 lens), data was acquired in three configurations:
1. Nikon 40× 0.95 NA, tilt=0°: the third objective in the emission path was a Nikon 40× 0.95 NA air objective in a standard remote refocus arrangement (axially aligned with no tilt) to provide a reliable system benchmark.
2. AMS-AGY v1.0, tilt=0°: the Nikon third objective of configuration 1 was replaced with the example of the specially-configured third objective with no tilt, so as to be directly comparable with configuration 1.
3. AMS-AGY v1.0, tilt=30°: the example of the system was configured using the AMS-AGY v.1.0 lens as the third objective with a tilt of 30° for comparison with configurations 1 and 2.

Four different patterns on the Argolight SIM slide were used for imaging:
Target: a 240 μm diameter set of concentric rings with a 10 μm spacing. Each ring consisted of two line pairs separated by 750 nm. (good for looking at the maximum field of view);
Grid: a 110×110 μm² square grid with 10 μm spacing. Each line pair is separated by 750 nm. (good for looking at the central higher-quality portion of the field of view and checking for field flatness and distortion);
SIM lines: 14 line pairs that range from fully overlapped to a separation of 390 nm in 30 nm steps. (good for evaluating resolution);
3D rings: 9×9×9 3D cubic array of submicron-diameter rings separated by 5 μm in X, Y, and Z. (good for evaluating a 3D field of view).

Data was collected for each of the three system configurations identified above, imaging the above-noted patterns and features.

Test data produced by imaging the above-noted four patterns for each of three system configurations identified above has shown that a Nikon-based remote refocus provides the same resolution as a conventional microscope. Using all Nikon objectives, the remote refocus portion of the emission path delivers at least 270 nm resolution at the center of the field of view. This is the same resolution provided by the primary objective on a standard commercial base. The remote refocus configured with the AMS-AGY v1.0 lens as the third objective also provides the same resolution as a conventional microscope. Substituting the AMS-AGY v1.0 lens for the third Nikon objective preserves 270 nm resolution in an untilted remote refocus. Images of the Target pattern demonstrated that both configurations 1 and 2 were able to image a 240×240 μm² field of view covered by the camera sensor, with line pairs visible to about 200 μm, well beyond the 100 μm diameter field of view that the system was designed for. Grid pattern imaging showed a high quality 110×110 μm² field of view, with line pairs visible throughout and minimal distortions. SIM line imaging demonstrated the 270 nm resolution at the center of the field of view. Image stacks of the 3D ring pattern showed that, qualitatively, there was no distinguishable difference in the imaging performance of configurations 1 and 2 over the 3D field of view.

Further, the remote refocus configured with the AMS-AGY v1.0 lens still gives the same resolution as a conventional microscope with a 30 degree tilt of the third microscope. Using the AMS-AGY v1.0 lens, the third microscope was tilted to an angle of 30 degrees, and the acquired image data demonstrated that system retained the 270 nm resolution on both parallel and perpendicular axes. By Rayleigh criterion, 270 nm resolution corresponds to an effective numerical aperture of 1.2. Image stacks acquired of the target and grid patterns, with a rescaling of y cos(α) (where α is the tile angle) applied to correct for "stretching" along the image y-axis caused by the tilt, demonstrated the ability to produce high quality images over the field of view, essentially of the same quality as achieved with configurations 1 and 2. Similarly, SIM line imaging and 3D ring pattern imaging performance was, after applying the y-axis rescaling and a z sin(α) shear correction, qualitatively indistinguishable from the untilted configurations.

Tables 3-5 below provide specifications for some alternative optical configurations for portions of the system of FIG. 10 based on the specifications provided in Table 1. For example, Table 3 below provides an example of an alternative for the primary objective.

TABLE 3

| Item # | Supplier | Part | Description | Qty |
|---|---|---|---|---|
| 2 | Olympus | UPLSAPO 60xS2 | Super Apochromat, 60x Silicone Oil Immersion Objective Lens, N.A. 1.3, W.D. 0.3 mm, F.O.V. 22 mm, DIC, Correction Collar 0.15-0.19 mm | 1 |
| 3 | Thorlabs | TL300-A | Laser Scanning Tube Lens, f = 300 mm, ARC: 400-700 nm | 1 |

In certain examples and applications, galvo scanning may not be needed. Table 4 below provides an example that may be used for, for example, for high content screening systems that use stage scanning or systems that use a piezo on the second objective to take volumes (or a combination of both). Table 5 below provides another example using the alternate primary objective described in Table 3 and with the galvo scanning removed.

TABLE 4

| Item # | Supplier | Part | Description | Qty |
|---|---|---|---|---|
| 3 | Thorlabs | TTL165-A | Tube Lens, f = 165 mm, ARC: 350-700 nm, External SM2 Threads (NOTE: this is not a Zeiss OEM tube lens) | 1 |
| 4-6 | N/A | N/A | Galvo scanning relay removed | 0 |
| 7 | Thorlabs | TL300-A | Laser Scanning Tube Lens, f = 300 mm, ARC: 400-700 nm | 1 |

TABLE 5

| Item # | Supplier | Part | Description | Qty |
|---|---|---|---|---|
| 2 | Olympus | UPLSAPO 60xS2 | Super Apochromat, 60x Silicone Oil Immersion Objective Lens, N.A. 1.3, W.D. 0.3 mm, F.O.V. 22 mm, DIC, Correction Collar 0.15-0.19 mm | 1 |
| 3 | Thorlabs | TTL165-A | Tube Lens, f = 165 mm, ARC: 350-700 nm, External SM2 Threads (this is not a Zeiss OEM tube lens) | 1 |
| 4-6 | N/A | N/A | Galvo scanning relay removed | 0 |
| 7 | Olympus | SWTLU-C | 180 mm focal length, tube lens unit. | 1 |
| 9 | Olympus | UPLSAPO 40x2 | Super Apochromat, 40x Objective Lens, N.A. 0.95, W.D. 0.18 mm, F.O.V. 26.5 mm, Correction Collar 0.11-0.23 mm | 1 |

EXAMPLE 2: DESIGN OPTIONS

Many applications will benefit from different choices of magnification, numerical aperture, field of view (FOV) and immersion medium (e.g. water). Table 6 below provides additional examples of primary objective choices. Various scanning regimes and field of view may also be implemented.

Embodiments not involving galvo scanning may be lower in cost due to fewer optics, higher in efficiency, and easier in terms of maintenance. No galvo may be attractive for high content screening systems that use stage scanning. Sample scanning may be a good option for scouting over large ranges, stage scanning, or high throughput screening (i.e. multiwell plate). The z range may be limited by the working distance of objective 1. Fast motion can couple to the sample via the immersion medium. An objective 1 scan may be good for traditional focusing using the working distance of the primary objective. An objective 2 scan may be good for fast scanning that is isolated from the sample using the remote space. The z range may be limited by either the mechanics of objects 2 and 3, or optically by the remote refocus range. An objective 3 scan may be similar to the objective 2 scan but in a tilted arrangement.

In embodiments involving one 'scan' galvo, FOV may be limited by objective 3 only on 1 axis. The primary objective may limit the field on the scan axis. Adding a galvo scan unit provides ultra-fast scanning and increases the FOV. The typical galvo step and settle time is shorter than the rolling time of a modern sCMOS chip and so the volumetric imaging rate is limited only by the data rate of the camera (or available photons).

In embodiments involving two 'XY' galvos, FOV may not be limited by objective 3. The primary objective may determine the field. A second (orthogonal) galvo scanner can be used as a tiling device to access the full field of the primary objective. This may be an attractive and agile way to access the FOV of the primary objective when using an optical train or a camera chip that does not support the full field in a single frame.

TABLE 6

| Supplier | Mag (NA) | Immersion (use) | W.D. (mm) | Part |
|---|---|---|---|---|
| Nikon | 60x (1.4) | Oil (coverslip) | 0.13 | MRD01605 |
| Nikon | 100x (1.35) | Silicone (coverslip) | 0.28-0.31 | MRD73950 |
| Nikon | 40x (1.25) | Silicone (coverslip) | 0.30 | MRD73400 |
| Nikon | 25x (1.05) | Silicone (coverslip) | 0.55 | MRD73250 |
| Nikon | 60x (1.27) | Water (coverslip) | 0.16-0.18 | MRD07650 |
| Nikon | 40x (1.15) | Water (coverslip) | 0.59-0.61 | MRD77410 |
| Nikon | 25x (1.1) | Water (dipping/coverslip) | 2.00 | MRD77220 |
| Olympus | 60x (1.42) | Oil (coverslip) | 0.15 | UPLXAPO60XO |
| Olympus | 100x (1.35) | Silicone (coverslip) | 0.20 | UPLSAPO100XS |
| Olympus | 60x (1.3) | Silicone (coverslip) | 0.30 | UPLSAPO60XS2 |
| Olympus | 40x (1.25) | Silicone (coverslip) | 0.30 | UPLSAPO40XS |
| Olympus | 30x (1.05) | Silicone (coverslip) | 0.80 | UPLSAPO30XS |
| Olympus | 60x (1.2) | Water (coverslip) | 0.28 | UPLSAPO60XW |
| Olympus | 40x (1.15) | Water (coverslip) | 0.25 | UAPON40XW340 |
| Olympus | 25x (1.05) | Water (dipping/coverslip) | 2.00 | XLPLN25XWMP2 |
| Olympus | 20x (1.0) | Water (dipping) | 2.00 | XLUMPLFLN20XW |

EXAMPLE 3: ALIGNMENT GOALS FOR GOOD PERFORMANCE

The following guidance may be applicable to various optical configurations:

XV and tip/tilt alignment: The primary objective (O1) sets the optical axis of the system. Each subsequent lens must then be aligned so that its optical axis is co-linear with the primary axis. In systems that include one or more galvos, each galvo mirror should be centred on the optical axis, and the rotation axis of each galvo should be coincident and perpendicular to the optical axis. This defines the xy (translation) and tip/tilt (rotation) of each element, and in practice this can be achieved using an appropriate laser beam.

Z alignment: In principle lens pairs should be axially separated so that they conserve collimation. i.e. for any pair of lenses a collimated beam input should give a collimated beam output. This is the easiest way to align the system and defines the z position of each lens once the primary objective position has been fixed. Galvo mirrors should be conjugated to the back focal plane of the primary objective (BPF1) so that a rotation of the mirror results in a pure translation in the image space (true for small angles).

Commercial bases: When using a commercial base it is typical that the primary objective (O1) and the first tube lens (TL1) do not conserve collimation (usually the tube lens is too close). This can be corrected by shunting the whole optical train after the first scan lens (SL1) to restore collimation. For systems with no galvo the correction can be done after the second tube lens (TL2). The following equations describe the required displacement for each case and can be used as a guide of magnitude (in practice the correct displacement must be found by aligning with an appropriate laser beam):

No galvo: $d_2 = f_{TL2} + (f_{TL1} - d_1)M_{BFP}^2$, where $M_{BFP1} = f_{TL2}/f_{TL1}$ One or more galvos: $d_{SL1} = f_{SL1} + (f_{TL1} - d_1)M_{BFP1}^2$ where $M_{BFP1} = f_{SL1}/f_{TL1}$ Note: in addition to the above, when using a commercial base for best performance O1 should be at its nominal focal position (for the intended samples) to ensure good back focal plane mapping.

Back focal plane mapping: if the preceding goals are achieved then the back focal plane of the primary objective ($BFP_1$) will be effectively imaged throughout the system i.e. $BFP_1$ to G1, G1 to $BFP_2$ and $BFP_2$ to $BFP_3$ (and the same concept applies with no galvo or 2 galvo systems). It is similar to relaying the image planes $IP_0$ through to $IP_4$ but with more subtle (but still significant) consequences if not done sufficiently well. Error in image plane alignment is usually obvious from the resulting defocus. Error in BFP relay can be more tricky to notice and result in the following symptoms:

Error in galvo to $BFP_1$: can result in angular motion coupled to what should be a pure translation of the image plane. This can modulate the tilt of the light-sheet as a function of scan and confuse the image processing and interpretation of data.

Error in $BFP_1$ to $BFP_2$: an easy mistake if one is not careful during alignment and can result in clipping the image of $BFP_1$ at $BFP_2$. The result is reduced effective numerical aperture and compromised remote refocus performance. If the point spread function measurements are good at $IP_1$ and disappointing in the remote space at $IP_2$ then be sure to check this alignment.

Error in $BFP_2$ to $BFP_3$: also easy to do if not careful during alignment and also results in reducing the effective numerical aperture of the system. If the point spread function measurements are good in the remote space at $IP_2$ and disappointing at $IP_4$ then be sure to check this alignment.

Note: if O1 has a z range (e.g. ~10 mm on a commercial base) then for best performance it should be set to its nominal focal position (for the intended samples) during alignment stage.

Light-sheet coupling and tilt angle 'α': any given light-sheet should be coupled into the primary objective (O1) so that its marginal ray is coincident with the marginal ray of the objective (i.e. the edge of the light-sheet should touch the maximum collection cone angle of the objective). For a given choice of light-sheet the third microscope system should then be tilted so that the light-sheet is uniformly in focus. There are many choices of primary objective and many light-sheet options which together will determine the resulting tilt angle α, and so an exact alignment target cannot be set without further specifying the system. However, by following this basic alignment protocol unnecessary losses in resolution and efficiency can be avoided.

Galvo flatness: If the above alignment goals have been achieved but strange PSF results are being exhibited then check the galvo flatness (for example using a shearing interferometer). Specify better than λ/10 PV or λ/14 RMS over the aperture (image of BFP1 at the galvo).

EXAMPLE 4: CONFIGURATION GUIDE FOR HIGH NA SINGLE-OBJECTIVE LIGHT-SHEETS

The following non-limiting guidelines may facilitate configuration of a single-objective light-sheet microscope in accordance with one or more embodiments.
1. Pick a primary objective (O1): use the table below to select a primary objective based on the intended sample type. With O1 selected, use the corresponding manufacturer's tube lens (TL1) for commercial base compatibility. Now select a remote refocus module by choosing recommended secondary objectives (O2) and corresponding tube lenses (TL2). Note: this choice is independent from the base microscope, for example a Nikon has (O1+TL1) can be matched with an Olympus remote refocus (O2+TL2).

Oil Immersion with Coverslip

| Primary objective (O1 + TL1) | Secondary objective (O2 + TL2) |
|---|---|
| Nikon 60x1.4 Oil (MRD01605 + MXA22018) or Olympus 60x1.42 Oil (UPLXAPO60XO + SWTLU-C) | Nikon 40x0.95 (MRD00405 + MXA22018) or Olympus 40x0.95 (UPLXAPO40X + SWTLU-C) |

Silicone Immersion with Coverslip

| Primary objective (O1 + TL1) | Secondary objective (O2 + TL2) |
|---|---|
| Nikon 100x1.35 Sil (MRD73950 + MXA22018) or Olympus 100x1.35 Sil (UPLSAPO100XS + SWTLU-C) Olympus 60x1.3 Sil (UPLSAPO60XS2) + (SWTLU-C) | Nikon 40x0.95 (MRD00405 + EFL357) or Olympus 40x0.95 (UPLXAPO40X + EFL321) Nikon 40x0.95 (MRD00405 + EFL214) or Olympus 40x0.95 (UPLXAPO40X + EFL493) |
| Nikon 40x1.25 Sil (MRD73400 + MXA22018) or Olympus 40x1.25 Sil (UPLSAPO40XSS + SWTLU-C) Olympus 30x1.05 Sil (UPLSAPO30XS + SWTLU-C) | Nikon 40x0.95 (MRD00405 + EFL143) or Olympus 40x0.95 (UPLXAPO40X + EFL129) Nikon 20x0.75 (MRD00205 + EFL214) or Olympus 20x0.8 (UPLXAPO20X + EFL193) |
| Nikon 25x1.05 Sil (MRD73250 + MXA22018) | Nikon 20x0.75 (MRD00205 + EFL179) or Olympus 20x0.8 (UPLXAPO20X + EFL161) |

Water Immersion with Coverslip

| Primary objective (O1 + TL1) | Secondary objective (O2 + TL2) |
|---|---|
| Nikon 60x1.27 W (MRD07650 + MXA22018) or Olympus 60x1.2 W (UPLSAPO60XW + SWTLU-C) Nikon 40x1.15 W (MRD77410 + MXA22018) or | Nikon 40x0.95 (MRD00405 + EFL226) or Olympus 40x0.95 (UPLXAPO40X + EFL203) Nikon 40x0.95 (MRD00405 + EFL150) or |
| Olympus 40x1.15 W (UAPON40XW340 + SWTLU-C) | Olympus 40x0.95 (UPLXAPO40X + EFL135) |

Water Dipping

| Primary objective (O1 + TL1) | Secondary objective (O2 + TL2) |
|---|---|
| Nikon 25x1.1 W (MRD77220 + MXA22018) or Olympus 25x1.05 W (XLPLN25XWMP2 + SWTLU-C) Olympus 20x1.0 W (XLUMPLFLN20XW + SWTLU-C) | Nikon 20x0.75 (MRD00205 + EFL188) or Olympus 20x0.8 (UPLXAPO20X + EFL169) Nikon 20x0.75 (MRD00205 + EFL150) or Olympus 20x0.8 (UPLXAPO20X + EFL135) |

2. Pick 0, 1 or 2 galvo scanners: galvo scanners provide ultrafast scanning over the full field of the primary objective, but they may not be optimal for every system as they add extra optics etc. The following (unity magnification) relay is a good starting point:

| Scan lens 1 (SL1) | Galvo 1 (G1) | Scan lens 2 (SL2) |
|---|---|---|
| Thorlabs 70 mm (CLS-SL) | Thorlabs Ø5 mm (GVS201) or Thorlabs Ø10 mm (GVS211) | Thorlabs 70 mm (CLS-SL) |

Galvo Scanner Considerations

Magnification: the galvo scanner must be a unity magnification relay:

$$f_{SL2}/f_{SL1}=1$$

Scan lens performance: make sure the scan lenses are capable of handling the pupil size, field and color range you want to accommodate. For example the CLS-SL scanner above can deliver the following (diffraction limited) field diameters over (400-700) nm with the given pupil size:
Ø26 mm field, Ø2.5 mm pupil
Ø22 mm field, Ø3 mm pupil
Ø16 mm field, Ø4 mm pupil
Ø13 mm field, Ø5 mm pupil
Ø11 mm field, Ø6 mm pupil
Ø9 mm field, Ø7 mm pupil
Note: the pupil diameter should exceed the image of the back focal plane of the primary objective:
scan pupil≥$BFP_1(f_{SL1}/f_{TL1})$ where $BFP_1=2f_{TL1}(NA_1/M_1)$ (and $NA_1$ and $M_1$ are the numerical aperture and magnification of O1)

Galvo size: to avoid clipping the image of the back focal plane of the primary objective, make sure the galvo diameter is large enough:

$$\bar{d}_{G1} \geq \sqrt{2} \text{ scan pupil}$$

Note: galvo mirrors are typically thin so they are light and fast to rotate. As the mirror diameter increases it becomes harder to maintain flatness which can seriously degrade optical performance. If you want to buy your way out of this potential problem then specify better than λ/10 PV or λ/14 RMS for the mirror.

3. Pick a camera: a high quantum efficiency (QE), low read noise sCMOS chip may be recommended. For example the PCO edge 4.2 is a fine choice for most configurations. Consider the following when selecting a camera:

Pixel number: The AMS-AGY v1.0 objective can deliver Ø150 μm of diffraction limited field and up to Ø250 μm at lower NA. For Nyquist sampling at $\lambda_{ave}$~0.55 μm this equates to ~900 pixels of the highest quality and up to ~1500 pixels where imaging is still very good:

pixel number≈2field $NA_3/(0.61\lambda)$ ($NA_3$=1.0 for the AMS-AGY objective)

Pixel size: The AMS-AGY v1.0 objective has a 5 mm effective focal length. The last tube lens TL3 can be used as a free parameter to tune the magnification for Nyquist:

$f_{TL3}$≈$2f_{O3}$ pixel size $NA_3/(0.6\lambda)$

So for a PCO edge 4.2 with 6.5 μm pixels $f_{TL3}$~200 mm at $\lambda_{ave}$~0.55 μm (194 mm from equation).

EXAMPLE 5: EXPANSION MICROSCOPY ON RELATIVELY LARGE (AQUEOUS) SAMPLES AT HIGH RESOLUTION

The following provides an example of a module, implemented in accordance with the above-discussed aspects and embodiments, that can be coupled to a standard microscope to express a high resolution image on samples that are weakly fluorescent. This system uses a light-sheet with minimal optics on the emission path. A Nikon base and an Olympus objective are used.

For large samples in this example, a galvo relay will not be used. Instead, the sample will be scanned at a slower rate but with no limits on size except for the relatively large working distance of the primary objective (~600 μm in this case). An AR coated window will be used at the second objective for maximum transmission. In the case that sample scanning is an issue, a galvo scanner can be added later.

Table 7 below provides the optical train and image parts for an example set up with these criteria in mind.

EXAMPLE 6: ZEBRAFISH—WATER DIPPING SYSTEM WITH A LARGE FIELD OF VIEW AND LONG WORKING DISTANCE

The following provides an example of a module, implemented in accordance with the above-discussed aspects and embodiments, that can be coupled to a standard microscope to optimize field of view and speed. As such, a 2 galvo system will be chosen to maximize the data rate on an sCMOS camera at the cost of optical performance.

System notes:

$BF_1$=2*180*(1/20)=18 mm

Scan pupil=18*(70/180)=7 mm $d_{G1}$=√2*scan pupil=9.9 mm

The 7 mm scan pupil is large for the CLS-SL scanning relay so the diffraction limited field will be about 9 mm at IP1 (or about 450 μm in the sample) but it will still image up to 22 mm at lower numerical aperture (which is the field number of the primary objective). A 10 mm galvo is large enough for the pupil, but this is quite a big mirror so flatness should be checked. Here, a standard 25 mm coverslip is used to correct O2 In order to save on cost.

With all the criteria in mind, the optical train system set up is found below in Table 8:

TABLE 7

| Item ID | Supplier | Part | Description | Qty |
|---|---|---|---|---|
| S | Biologist | Sample | expanded samples, refractive index: ~1.33 | 1 |
| O1 | Nikon | MRD77410 | 40x(1.15) water through coverslip, W.D. 0.59-0.61 mm, 22 mm field | 1 |
| TL1 | Nikon | MXA22018 | Tube lens, EFL = 200 mm | 1 |
| TL2 | Thorlabs | EFL135 | Tube lens assembly, EFL = 135 mm | 1 |
| D | Chroma | ZT405/488/561/640rpcv2 | Quad band dichroic (excitation coupling) | 1 |
| O2 | Olympus | UPLXAPO40X | 40x0.95 CFI Plan Apo Lambda | 1 |
| O2* | Various | N/A | NBK-7 window, OD: (10 +/− 0.2) mm, Thk: (0.170 +/− 0.05) mm, TWE: ¼ wave, parallelism: <10 μm, polished: 40/20 and coated: $T_{avg}$ >99%, (400-700) nm @ 0° AOI both sides | 1 |
| O3 | ASI | AMS-AGY v1.0 | Special glass-tipped objective | 1 |
| E | Chroma | ZET405/488/561/640m | Quad emission filter, Ø25 mm mounted | 1 |
| TL3 | Nikon | MXA22018 | Tube lens, EFL = 200 mm | 1 |
| C | PCO | edge 4.2 | sCMOS camera, 2048 × 2048 pixels with 6.5 × 6.5 μm² size | 1 |

TABLE 8

| Item ID | Supplier | Part | Description | Qty |
|---|---|---|---|---|
| S | Biologist | Sample | Zebrafish in water, refractive index: ~1.33 | 1 |
| O1 | Olympus | XLUMPLFLN20XW | 20x(1.0) water dipping, W.D. = 2 mm, 22 mm field | 1 |
| TL1 | Olympus | SWTLU-C | Tube lens, EFL = 180 mm | 1 |
| SL1 | Thorlabs | CLS-SL | Scan lens, EFL = 70 mm | 1 |
| G1 | Thorlabs | GVS211 | 1D scan galvo, Ø10 mm | 1 |
| SL2 | Thorlabs | CLS-SL | Scan lens, EFL = 70 mm | 1 |
| SL3 | Thorlabs | CLS-SL | Scan lens, EFL = 70 mm | 1 |
| G2 | Thorlabs | GVS211 | 1D tile galvo, Ø10 mm | 1 |
| SL4 | Thorlabs | CLS-SL | Scan lens, EFL = 70 mm | 1 |
| TL2 | Thorlabs | EFL150 | Tube lens assembly, EFL = 150 mm | 1 |
| D | Chroma | ZT405/488/561/640rpcv2 | Quad band dichroic (excitation coupling) | 1 |
| O2 | Nikon | MRD00205 | 20x0.75 CFI Plan Apo Lambda | 1 |
| O2* | Various | N/A | Coverslip, OD: ~25 mm, Thk: (0.170 +/− 0.05) mm | 1 |
| O3 | ASI | AMS-AGY v1.0 | Special glass-tipped objective | 1 |
| E | Chroma | ZET405/488/561/640m | Quad emission filter, Ø25 mm mounted | 1 |
| TL3 | Nikon | MXA22018 | Tube lens, EFL = 200 mm | 1 |
| C | PCO | edge 4.2 | sCMOS camera, 2048 × 2048 pixels with 6.5 × 6.5 µm² size | 1 |

EXAMPLE 7: TUBE LENS ASSEMBLIES

One of the challenges of designing a single-objective light-sheet is making a good remote re-focus. For an air based remote refocus a key requirement is to match the magnification of the remote image to the refractive index of the primary objective. As the primary objective changes, often the magnification and refractive index also change, which can make it awkward to find the right set of optics. Table 9 below provides examples of various tube lens assemblies.

TABLE 9

| TL2 assembly | Optical components (part#) |
|---|---|
| EFL129 | Thorlabs (TTL200MP) + 2x (AC508-500-A) |
| EFL135 | Thorlabs (TTL200MP) + (AC508-750-A) + (AC508-500-A) |
| EFL143 | Thorlabs (TTL200MP) + (AC508-750-A) + (AC508-500-A) |
| EFL150 | Thorlabs (TTL200MP) + 2x (AC508-750-A) |
| EFL161 | Thorlabs (TTL200MP) + 2x (AC508-1000-A) |
| EFL169 | Thorlabs (TTL200MP) + 2x (AC508-750-A) |
| EFL179 | Thorlabs (TTL200MP) + (AC508-1000-A) or Olympus (SWTLU-C) |
| EFL188 | Thorlabs (TTL200MP) + (AC508-1000-A) |
| EFL193 | Thorlabs (TTL200MP) + (AC508-1000-A) |
| EFL203 | Thorlabs (TTL200MP) + (LF-1141-A) or Nikon (MXA22018) |
| EFL214 | Thorlabs 3x (AC508-750-A) + (AC508-1000-A) |
| EFL226 | Thorlabs 3x (AC508-750-A) + (AC508-1000-A) |
| EFL321 | Thorlabs (AC508-750-A) + (AC508-500-A) |
| EFL357 | Thorlabs (AC508-750-A) + (AC508-500-A) |

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. It is to be appreciated that embodiments of the methods and apparatuses discussed herein are not limited in application to the details of construction and the arrangement of components set forth in the foregoing description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. the terms light, light signal, and optical signal may be used interchangeably herein and refer generally to an electromagnetic signal that propagates through a given medium, which may be empty space, e.g., a vacuum, or may be an atmospheric, e.g., air, or other medium, such as fiber or other optics components. The terms "light," "light signal," and "optical signal" are not meant to imply any particular characteristic of the light, such as frequency or wavelength, band, coherency, spectral density, quality factor, etc., and may include infrared, visible, and/or ultraviolet electromagnetic radiation, or other non-ionizing electromagnetic radiation conventionally processed in the field of optics.

Accordingly, the foregoing description and drawings are by way of example only.

The invention claimed is:

1. An oblique plane microscopy system configured to image a sample having a refractive index no, the system comprising:

a first microscope arranged to receive light emitted from the sample, the first microscope including a first objective lens having at least one of a first numerical aperture $NA_1 \geq n_0$ and a first immersion medium with a first refractive index $n_1$ that is approximately equal to $n_0$;

a second microscope including a second objective lens, a combination of the first and second microscopes being configured to produce an intermediate image of the sample with a magnification $M_{RR}$, the second objective lens having a second numerical aperture $NA_2$, the intermediate image being formed in a second immersion medium having a second refractive index $n_2$, wherein the magnification $M_{RR}$ is approximately equal to a ratio $(n_1/n_2)$ of the refractive indices of the first and second immersion media; and a third microscope focused on the intermediate image and including a third objective lens having a third numerical aperture, the third objective having an optical axis that is tilted relative to an optical axis of the second objective by a tilt angle such that the third microscope images an oblique plane in the intermediate image, corresponding to an oblique plane in the sample, the third objective lens being configured and arranged to collect substantially all the light from the second microscope, wherein the third objective lens includes a solid glass frustum configured with a working distance in a range of 0-20 μm in air.

2. The oblique plane microscopy system of claim 1, wherein the refractive index of the sample is in a range of 1.33 to 1.41.

3. The oblique plane microscopy system of claim 2, wherein the first objective lens is a silicone immersion lens.

4. The oblique plane microscopy system of claim 3, wherein the first numerical aperture is $NA_1 \geq 1.35$.

5. The oblique plane microscopy system of claim 3, wherein the second immersion medium is air such that the second refractive index is $n_2=1.0$.

6. The oblique plane microscopy system of claim 4, wherein the first refractive index is $n_1=1.41$.

7. The oblique plane microscopy system of claim 4, wherein the second numerical aperture is $NA_2 \geq 0.95$.

8. The oblique plane microscopy system of claim 1, further comprising a light source arranged to provide an incident beam of light to illuminate an oblique plane in the sample, the oblique plane illuminated corresponding to the oblique plane being imaged.

9. The oblique plane microscopy system of claim 8, wherein the incident beam of light is directed through the first objective lens.

10. The oblique plane microscopy system of claim 9, wherein the third microscope is rotatable to adjust the tilt angle.

11. The oblique plane microscopy system of claim 10, wherein the tilt angle is selected based in part on a divergence angle of the illumination light beam.

12. The oblique plane microscopy system of claim 1, where a ratio of the second numerical aperture to the second refractive index $(NA_2/n_2)$ is greater than or equal to a ratio of the first numerical aperture to the first refractive index $(NA_1/n_1)$.

13. The oblique plane microscopy system of claim 1, wherein the tilt angle is selected to optimize a collection efficiency of the microscopy system.

14. The oblique plane microscopy system of claim 1, wherein the first objective lens is a glycerol immersion lens.

15. The oblique plane microscopy system of claim 1, wherein the third numerical aperture is $NA_3 \geq n_2$.

16. The oblique plane microscopy system of claim 1, wherein the third microscope is rotatable to adjust the tilt angle.

17. An oblique plane microscopy system configured to image a sample having a refractive index no, the system comprising:

a first microscope arranged to receive light emitted from the sample, the first microscope including a first objective lens having a first numerical aperture $NA_1$ and a first immersion medium with a first refractive index $n_1$, the first objective lens being configured based on a selected compromise between a first ideal condition of $NA_1 \geq n_0$ and a second ideal condition of $n_1$ being approximately equal to $n_0$;

a second microscope including a second, air-immersion objective, a combination of the first and second microscopes being configured to produce an intermediate image of the sample with a magnification $M_{RR}=n_1$, and wherein a second numerical aperture of the second, air-immersion, objective, $NA_2$, is selected to approach a third ideal condition of $NA_2$ being greater than or equal to a ratio of the first numerical aperture to the first refractive index $(NA_1/n_1)$; and a third microscope focused on the intermediate image and including a third objective lens having a third numerical aperture $NA_3 \geq 1$, the third objective having an optical axis that is tilted relative to an optical axis of the second objective by a tilt angle such that the third microscope images an oblique plane in the intermediate image, corresponding to an oblique plane in the sample, wherein the third objective lens includes a solid glass frustum positioned to intersect a field-of-view of the second air-immersion objective.

18. The oblique plane microscopy system of claim 17, wherein the first objective lens is a silicone immersion objective.

19. The oblique plane microscopy system of claim 17, wherein: the solid glass frustum has a beveled edge or the solid glass frustum is shaped to allow an end region having a size corresponding to the field-of-view of the second, air-immersion objective to be inserted into the field-of-view and to collect the available light from the second, air-immersion objective.

20. The oblique plane microscopy system of claim 17, wherein the tilt angle is selected to optimize a collection efficiency of the microscopy system.

21. A method of configuring a microscopy system for imaging an oblique plane in a sample, the microscopy system including a first microscope, a second microscope, and a third microscope, the method comprising:

selecting a first objective for the first microscope based on a chosen compromise between first and second ideal conditions for the first objective, the first ideal condition being that the first objective has a first numerical aperture $NA_1 \geq n_0$, wherein no is an estimate of a refractive index of the sample, and the second ideal condition being that the first objective has a first immersion medium with a first refractive index $n_1 \approx n_0$, wherein the first objective is configured to direct an illumination light-sheet to the sample and to collect emission light from the sample;

selecting a second objective for the second microscope, the second objective being configured to collect substantially all the emission light from the first objective;

configuring the second microscope to re-image the oblique plane in the sample onto an intermediate image plane;

selecting a third objective for the third microscope, the third objective being positioned on an opposite side of the intermediate image plane relative to the second objective and configured to collect substantially all the emission light from the second objective while accommodating a tilt angle $\alpha$; and positioning the third objective such that a primary optical axis of the third objective is rotated relative to a primary optical axis of the second objective by the tilt angle $\alpha$, wherein:

configuring the second microscope to re-image the oblique plane in the sample includes configuring a magnification of the second microscope, $M_2$, such that a magnification, $M_{RR}$, of an image of the oblique plane in the sample at the intermediate image plane satisfies the condition: $M_{RR}=M_1 M_2^{-1}=n_1/n_2$, where $M_1$ is a magnification of the first microscope, $n_1$ is a refractive index of an immersion medium of the first objective, and $n_2$ is a refractive index of an immersion medium of the second objective;

selecting the second objective includes selecting an air-immersion second objective; or further comprising adjusting the tilt angle based in part on a divergence angle of the illumination light-sheet.

22. The method of claim 21, wherein:

the second microscope includes a lens, and wherein configuring the magnification of the second microscope includes selecting a focal length of the lens or selecting the second objective includes minimizing $n_2$ and selecting a second numerical aperture, $NA_2$, of the second objective to meet the condition:

$$NA_2/n_2 \geq NA_1/n_1.$$

23. The method of claim 21, wherein selecting the first objective includes selecting a silicone immersion objective or a glycerol immersion objective.

24. The method of claim 21, wherein selecting the third objective includes selecting a third objective having a solid glass frustum.

25. The method of claim 21, wherein positioning the third objective includes positioning the third objective such that a tip of the solid glass frustum intersects a field-of-view of the second objective.

26. An oblique plane microscopy system configured to image a sample having a refractive index $n_0$, the system comprising:

a first microscope arranged to receive light emitted from the sample, the first microscope including a first objective lens having at least one of a first numerical aperture $NA_1 \geq n_0$ and a first immersion medium with a first refractive index $n_1$ that is approximately equal to $n_0$;

a second microscope including a second objective lens, a combination of the first and second microscopes being configured to produce an intermediate image of the sample with a magnification $M_{RR}$, the second objective lens having a second numerical aperture $NA_2$, the intermediate image being formed in a second immersion medium having a second refractive index $n_2$, wherein the magnification $M_{RR}$ is approximately equal to a ratio $(n_1/n_2)$ of the refractive indices of the first and second immersion media; and a third microscope focused on the intermediate image and including a third objective lens having a third numerical aperture, the third objective having an optical axis that is tilted relative to an optical axis of the second objective by a tilt angle such that the third microscope images an oblique plane in the intermediate image, corresponding to an oblique plane in the sample, the third objective lens being configured and arranged to collect substantially all the light from the second microscope, wherein the first microscope further includes a first lens, the first microscope having a first magnification $M_1$, and wherein the second microscope further includes a second lens having a focal length, $f_{TL2}$, selected to set a magnification of the second microscope, $M_2$, such that $M_{RR}=M_1 * M_2^{-1}=(n_1/n_2)$.

* * * * *